US011493761B2

United States Patent
Schultz et al.

(10) Patent No.: US 11,493,761 B2
(45) Date of Patent: Nov. 8, 2022

(54) FIXED FOCUS IMAGE LIGHT GUIDE WITH ZONED DIFFRACTION GRATINGS

(71) Applicant: Vuzix Corporation, West Henrietta, NY (US)

(72) Inventors: Robert J. Schultz, Victor, NY (US); Marek W. Kowarz, Henrieta, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 192 days.

(21) Appl. No.: 16/614,180

(22) PCT Filed: May 3, 2018

(86) PCT No.: PCT/US2018/030821
§ 371 (c)(1),
(2) Date: Nov. 15, 2019

(87) PCT Pub. No.: WO2018/213009
PCT Pub. Date: Nov. 22, 2018

(65) Prior Publication Data

US 2021/0333551 A1 Oct. 28, 2021

Related U.S. Application Data

(60) Provisional application No. 62/507,550, filed on May 17, 2017.

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0038* (2013.01); *G02B 6/0058* (2013.01)

(58) Field of Classification Search
None
See application file for complete search history.

(56) References Cited

U.S. PATENT DOCUMENTS 8,531,772 B2 9/2013 Chann et al.
9,372,347 B1 6/2016 Levola et al.
(Continued)

FOREIGN PATENT DOCUMENTS

CN 106371222 * 2/2017
EP 0981065 A2 2/2000
(Continued)

OTHER PUBLICATIONS

International Search Report and Written Opinion of the ISA/US, International Application No. PCT/US2018/030821, dated Jul. 19, 2018.

(Continued)

*Primary Examiner* — Chad H Smith
(74) *Attorney, Agent, or Firm* — Harter Secrest & Emery LLP; Jacob D. Merrill, Esq.

(57) ABSTRACT

An imaging apparatus for forming dual virtual images includes a planar waveguide, an in-coupling diffractive optic that directs a set of image-bearing light beams into the waveguide, and an out-coupling diffractive optic that directs the set of image-bearing light beams from the waveguide toward a viewer eyebox. The out-coupling diffractive optic includes an array of contiguous diffractive zones, each of which has a set of diffractive features having at least one of a common orientation and a common pitch. A succession of the zones along one dimension of the array have respective sets of diffractive features that progressively vary in at least one of orientation and pitch in a stepwise manner. The out-coupling diffractive optic is arranged together with the array of contiguous diffractive zones for forming a virtual
(Continued)

image that is viewable from the eyebox at a near focus distance.

36 Claims, 19 Drawing Sheets

(56) References Cited

U.S. PATENT DOCUMENTS

| | | | |
|---|---|---|---|
| 10,175,478 | B2 | 1/2019 | Tekolste et al. |
| 2009/0040580 | A1 | 2/2009 | Mukawa |
| 2013/0088780 | A1 | 4/2013 | Jarvenpaa et al. |
| 2015/0241705 | A1 | 8/2015 | Abovitz et al. |
| 2015/0346490 | A1 | 12/2015 | Tekolste et al. |
| 2016/0327789 | A1 | 11/2016 | Klug et al. |
| 2017/0108697 | A1 | 4/2017 | El-Ghoroury et al. |

FOREIGN PATENT DOCUMENTS

| | | | |
|---|---|---|---|
| EP | 2733517 | A1 | 5/2014 |
| EP | 2748659 | B1 | 5/2016 |
| WO | 2013028687 | A2 | 2/2013 |
| WO | 2016179246 | A1 | 11/2016 |
| WO | 2017039820 | A1 | 3/2017 |

OTHER PUBLICATIONS

European Patent Office, Supplementary European Search Report, European Patent Application No. 18801328.8, dated Nov. 11, 2020.

European Patent Office, Partial European Search Report, European Patent Application No. 21186747.8, dated Oct. 27, 2021.

Liu Yu-Jie, "Design of waveguide holographic configuration for display", Acta Photonica Sinica, vol. 44, No. 3, p. 0309003-1-0309003-5, (Mar. 2015).

* cited by examiner

FIXED FOCUS IMAGE LIGHT GUIDE WITH ZONED DIFFRACTION GRATINGS

TECHNICAL FIELD

This invention generally relates to electronic displays and more particularly relates to displays that use an image light guide to display virtual image content to a viewer.

BACKGROUND OF THE INVENTION

Head-Mounted Displays (HMDs) are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Optical image light guides convey image-bearing light to a viewer in a narrow space for directing the virtual image to the viewer's pupil and enabling this superposition function.

In such conventional image light guides, collimated, relatively angularly encoded light beams from an image source are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements or in other known ways. For example, the diffraction grating can be formed by surface relief. After propagating along the waveguide, the diffracted light can be directed back out of the waveguide by a similar output grating, which can be arranged to provide pupil expansion along one dimension of the virtual image. In addition, a turning grating can be positioned along the waveguide between the input and output gratings to provide pupil expansion in an orthogonal dimension of the virtual image. The image-bearing light output from the waveguide provides an expanded eyebox for the viewer.

Conventional image light guides form a virtual image at optical infinity, conveying only collimated light to the viewer eyebox. However, there can be advantages to forming the virtual image such that it appears to be focused at some close distance, such as in the range from 1 meter to 1.5 meters, for example. Using near-focused solutions can allow the viewer to have the advantage of augmented reality imaging in applications where it is useful to have the real-world scene content at a close distance.

There can be further benefits to a head-mounted optical imaging apparatus with an image light guide that forms both a conventional virtual image at infinity and another virtual image at a near distance from the viewer. At the same time, the apparatus should provide good visibility of the real-world scene that lies in the viewer's field of view. Solutions that have been proposed for providing this feature include bulky designs that require multiple image-forming components and employ complex timing schemes in order to present both near-focused and infinity-focused images.

Thus, it can be appreciated that there would be advantages to a display apparatus that forms virtual image content at a near-focus position.

SUMMARY OF THE INVENTION

It is an object of the present disclosure to advance the art of virtual image presentation particularly when using compact head-mounted devices and similar imaging apparatus. Advantageously, embodiments of the present disclosure provide an optical imaging apparatus that forms a virtual image so that it appears to be at a close fixed focus. This can allow simultaneous visibility of the virtual image with the real-world scene content that lies in the field of view of the viewer.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided an image light guide for forming a virtual image including a waveguide, an in-coupling diffractive optic, and an out-coupling diffractive optic. The in-coupling diffractive optic directs image-bearing light beams into the waveguide, and the out-coupling diffractive optic directs the image-bearing light beams from the waveguide toward a viewer eyebox. In addition, the out-coupling diffractive optic includes an array of zones each comprising a set of diffractive features. The diffractive features within each set have a common pitch. Successive zones along one dimension of the array have respective sets of diffractive features with a different common pitch that progressively varies between the successive zones in a stepwise manner for forming a virtual image that is viewable from the eyebox at a near focus distance.

The sets of diffractive features in the successive zones along the one dimension of the array can also share a common shape, such as a linear or curvilinear shape. The array of zones can be a multi-dimensional array of zones such that the one dimension of the array is a first dimension of the array along which the sets of diffractive features in the successive zones are oriented in the same direction. Successive zones along a second of the dimensions of the array can have respective sets of diffractive features that are oriented in different directions in a manner that progressively varies in a stepwise manner between the successive zones along the second dimension.

The respective sets of diffractive features within the successive zones along the second dimension of the array can also have a different common pitch. However, the displacements between the diffractive features along the first dimension of the array can remain the same between the successive zones along the second dimension of the array. The diffractive features of adjacent zones along the second dimension of the array can have respective linear diffractive features that abut each other forming contiguous chordal segments of a curve.

Each of the image-bearing light beams includes angularly encoded information concerning a pixel within the virtual image and the multi-dimensional array of zones preferably provides for overlapping each of the image-bearing light beams within the eyebox in a form that produces the virtual image at the near focus distance on an opposite side of the waveguide as viewed within the eyebox. The multi-dimensional array of zones preferably focuses each of the image-bearing light beams within the virtual image to a different focus spot, and both the stepwise variation in pitch between the successive zones along the first dimension of the array and a stepwise variation in the orientation of the diffractive features between the successive zones along the second dimension of the array are preferably limited to avoid overlap between the different focus spots within the virtual image.

The out-coupling diffractive optic is preferably arranged to reflect one portion and to diffract another portion of each of the image-bearing light beams through each of a plurality of encounters with each of the image-bearing light beams. An intermediate turning grating preferably provides for expanding one dimension of each of the image-bearing light beams in advance of the out-coupling diffractive optic, and each of the so-expanded image-bearing light beams preferably encounters a plurality of zones along the second dimension of the array upon each encounter of the image-bearing light beam with the out-coupling diffractive optic.

According to another aspect of the present disclosure, there is provided another image light guide for forming a virtual image including a waveguide, an in-coupling diffractive optic, and an out-coupling diffractive optic. The in-coupling diffractive optic directs image-bearing light beams into the waveguide, and the out-coupling diffractive optic directs the image-bearing light beams from the waveguide toward a viewer eyebox. The out-coupling diffractive optic including an array of zones each comprising a set of diffractive features. The diffractive features within each set have a common orientation. Successive zones along one dimension of the array have respective sets of diffractive features with different orientations that progressively vary between the successive zones in a stepwise manner for forming a virtual image that is viewable from the eyebox at a near focus distance.

The array of zones is a multi-dimensional array of zones and the one dimension of the array is a second dimension of the array and the sets of diffractive features along a first dimension of the array are oriented in the same direction. The diffractive features along the first dimension of the array can progressively vary in pitch. Alternatively, the diffractive features within each set can have equal pitch and successive zones along the first dimension of the array can have respective sets of diffractive features with a different pitch that progressively varies between the successive zones in a stepwise manner along the first dimension of the array. The diffractive features within the successive zones along the second dimension of the array can also have a differing pitch. However, displacements between the diffractive features along the first dimension of the array can remain the same between the successive zones along the second dimension of the array.

According to another aspect of the present disclosure, there is provided an imaging apparatus for forming a virtual image having a planar waveguide, an in-coupling diffractive optic that directs image-bearing light beams into the waveguide, and an out-coupling diffractive optic that directs the image-bearing light beams from the waveguide toward a viewer eyebox. The waveguide is arranged for propagating the image-bearing light beams from the in-coupling diffractive optic to the out-coupling diffractive optic as a set of angularly related collimated beams. The out-coupling diffractive optic includes a two-dimensional array of contiguous diffractive zones. Each of the diffractive zones (i) has first and second pairs of opposite sides and (ii) has a set of diffractive features that extend between the second pair of opposite sides, wherein the diffractive features in each set have a common orientation and a common pitch. A succession of the zones along a first dimension of the array has contiguous sides among the first pair of sides and respective sets of diffractive features that progressively vary in pitch in a stepwise manner. A succession of the zones along a second dimension of the array has contiguous sides among the second pair of sides and respective sets of diffractive features that progressively vary in orientation in a stepwise manner. The successions of zones along the first and second dimensions of the array are arranged for converting each of the collimated beams into a diverging beam that appears to emanate from a near focus spot on an opposite side of the planar waveguide as viewed within the eyebox.

Preferably, the out-coupling diffractive optic focuses each of the image-bearing light beams within the virtual image to a different focus spot, and both the stepwise variation in pitch between the successive zones along the first dimension of the array and a stepwise variation in the orientation of the diffractive features between the successive zones along the second dimension of the array are limited to avoid overlap between the different focus spots within the virtual image.

According to yet another aspect of the present disclosure, there is provided an imaging apparatus for forming dual virtual images including a planar waveguide, a first in-coupling diffractive optic that direct a first set of image-bearing light beams into the waveguide, a first out-coupling diffractive optic that directs the first set of image-bearing light beams from the waveguide toward a viewer eyebox, a second in-coupling diffractive optic that directs a second set of image-bearing light beams into the waveguide, and a second out-coupling diffractive optic that directs the second set of image-bearing light beams from the waveguide toward the viewer eyebox. The second out-coupling diffractive optic has an array of contiguous diffractive zones. Each of the diffractive zones has at least one pair of sides and a set of diffractive features having at least one of a common orientation and a common pitch. A succession of the zones along one dimension of the array has contiguous sides among the one pair of sides and respective sets of diffractive features that progressively vary in at least one of orientation and pitch in a stepwise manner, The first out-coupling diffractive optic is arranged for forming a virtual image that is viewable from the eyebox at a first focus distance, and the second out-coupling diffractive optic is arranged together with the array of contiguous diffractive zones for forming a virtual image that is viewable from the eyebox at a second nearer focus distance.

The waveguide is preferably arranged for propagating the second set image-bearing light beams from the second in-coupling diffractive optic to the second out-coupling diffractive optic as a set of angularly related collimated beams, and the array of contiguous diffractive zones is preferably arranged for converting each of the collimated beams into a diverging beam that appears to emanate from a near focus spot on an opposite side of the planar waveguide as viewed within the eyebox.

Preferably, the diffractive features within each of the sets of diffractive features have a common pitch, the one dimension of the array is a first dimension of the array, and the succession of zones along the first dimension of the array has respective sets of diffractive features with a different common pitch that progressively varies between the successive zones in a stepwise manner. In addition, the diffractive features within each of the sets of diffractive features preferably have a common orientation, and a succession of zones along a second dimension of the array has respective sets of diffractive features with a different common orientation that progressively varies between the successive zones along the second dimension in a stepwise manner.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings, wherein:

Figure 3A:
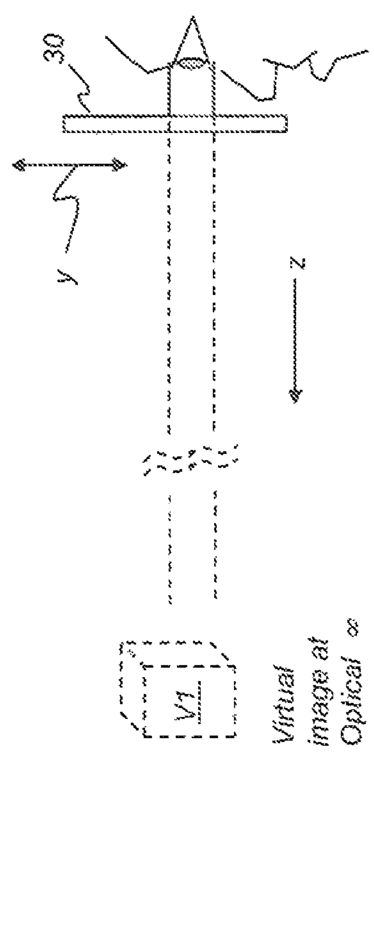
Figure 3B:
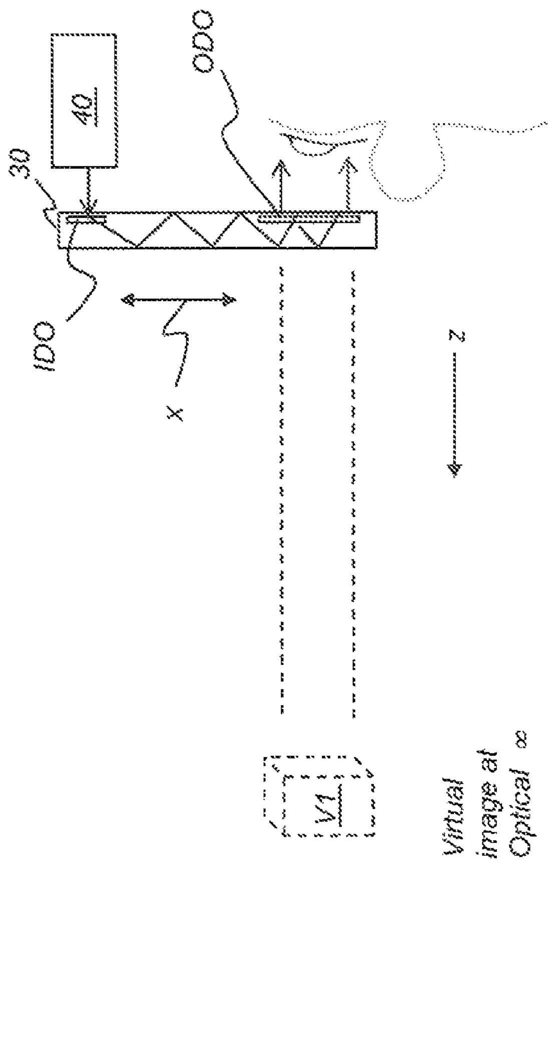
Figure 3C:
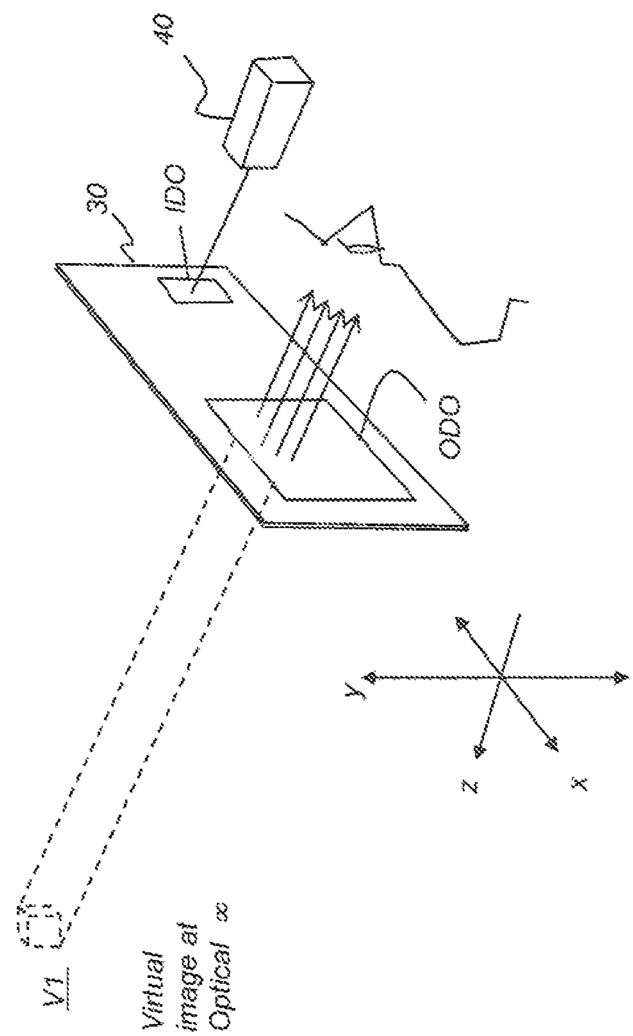

FIGS. 3A, 3B, and 3C are side, top, and perspective views, respectively, of an imaging apparatus with an image light guide for forming a virtual image at infinity focus.

Figure 4A:
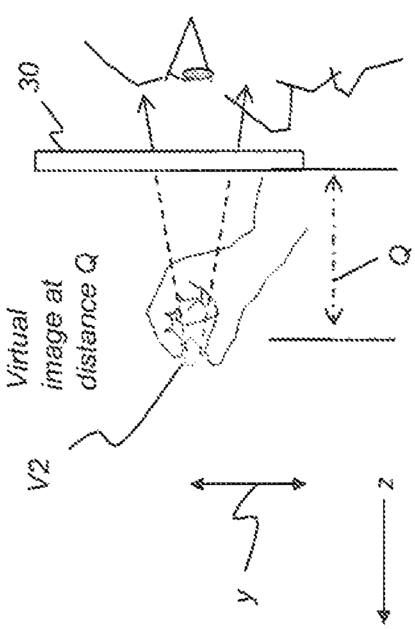
Figure 4B:
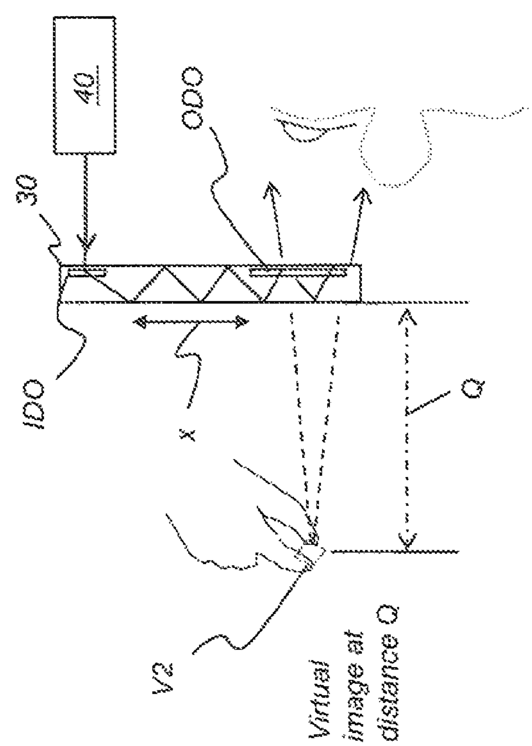
Figure 4C:
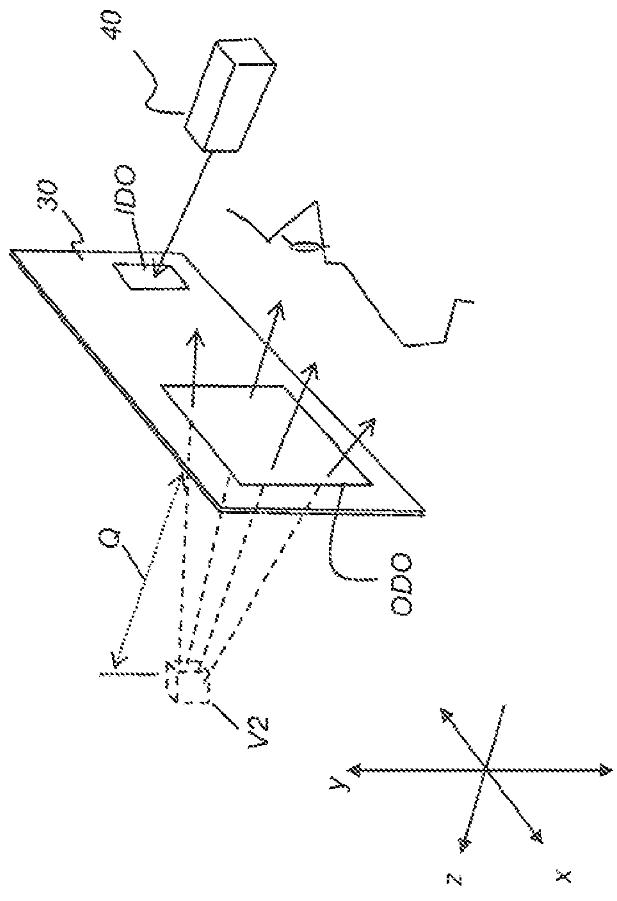

FIGS. 4A, 4B, and 4C are side, top, and perspective views, respectively, of an imaging apparatus with an image light guide for forming a virtual image at a near focus position according to an embodiment of the present disclosure.

Figure 5:
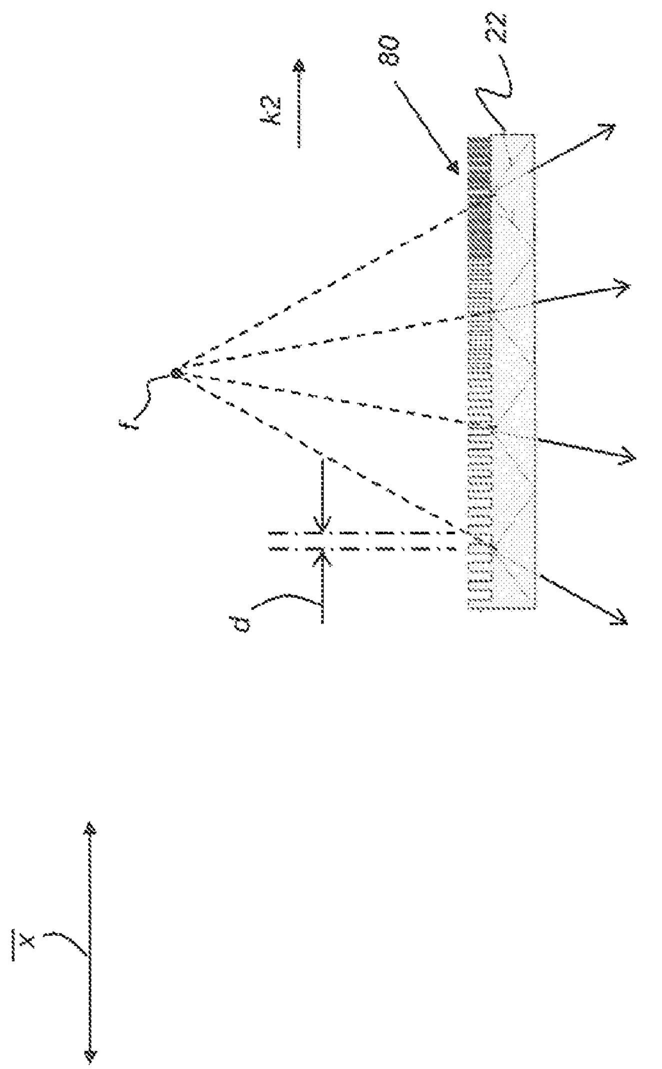

FIG. 5 is a cross-sectional side view of a portion of a diffractive optic featuring a progressive variation in pitch along a first dimension of the diffractive optic for generating a virtual focus for one dimension of an image.

Figure 6A:
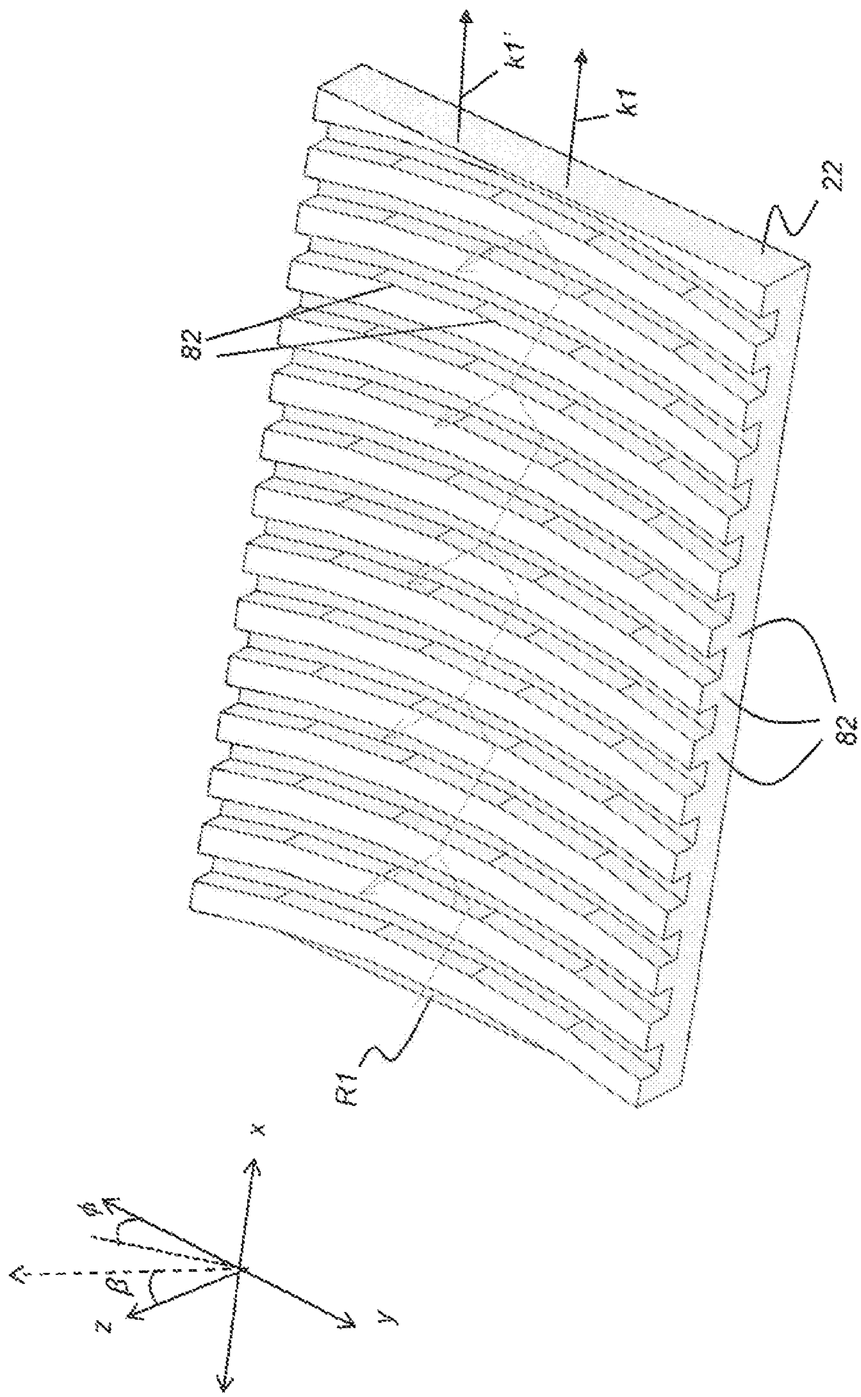
Figure 6B:
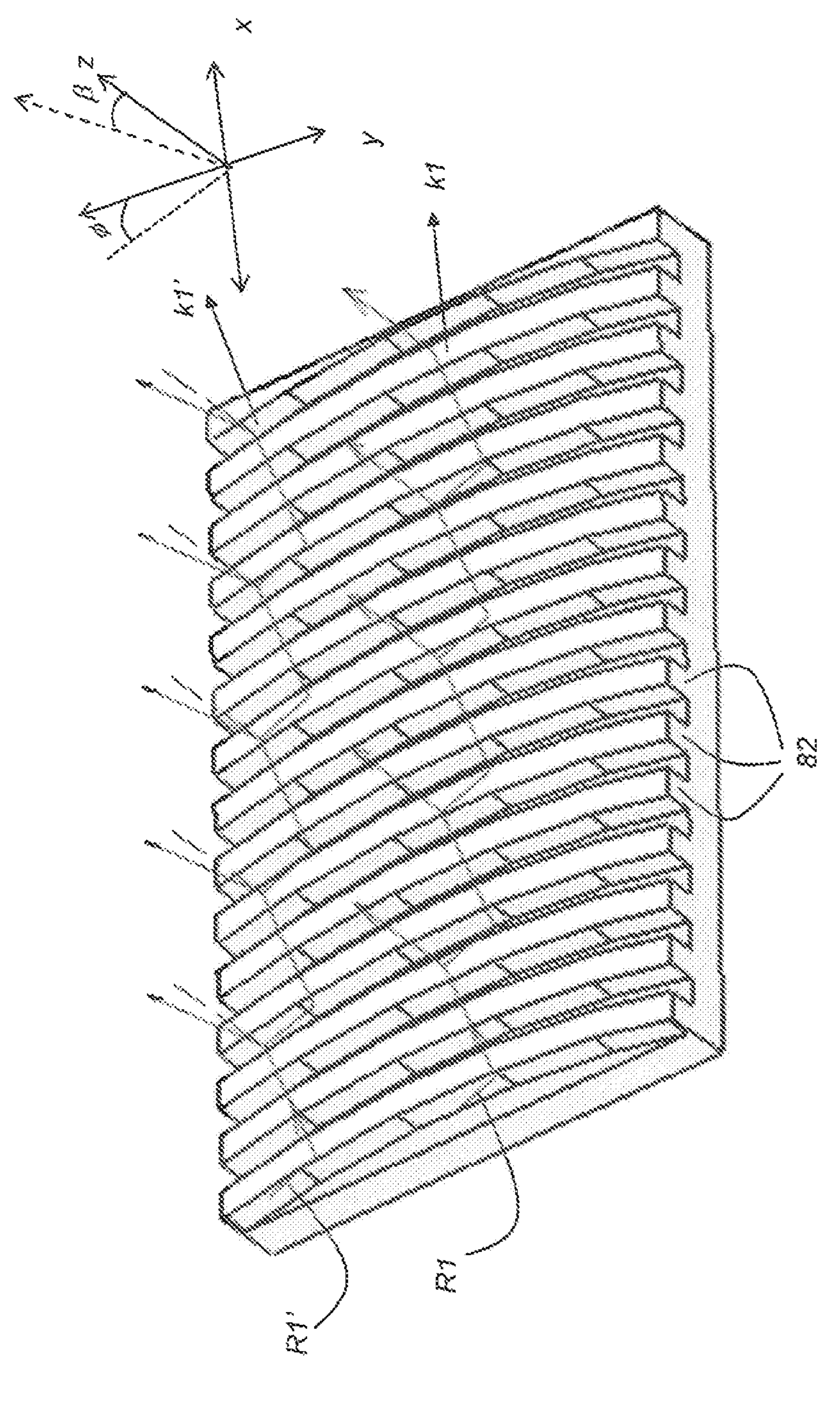

FIGS. 6A and 6B are perspective views of a portion of a diffractive optic featuring a stepwise variation in an orientation angle of diffractive features along a second dimension of the diffractive optic.

Figure 7A:
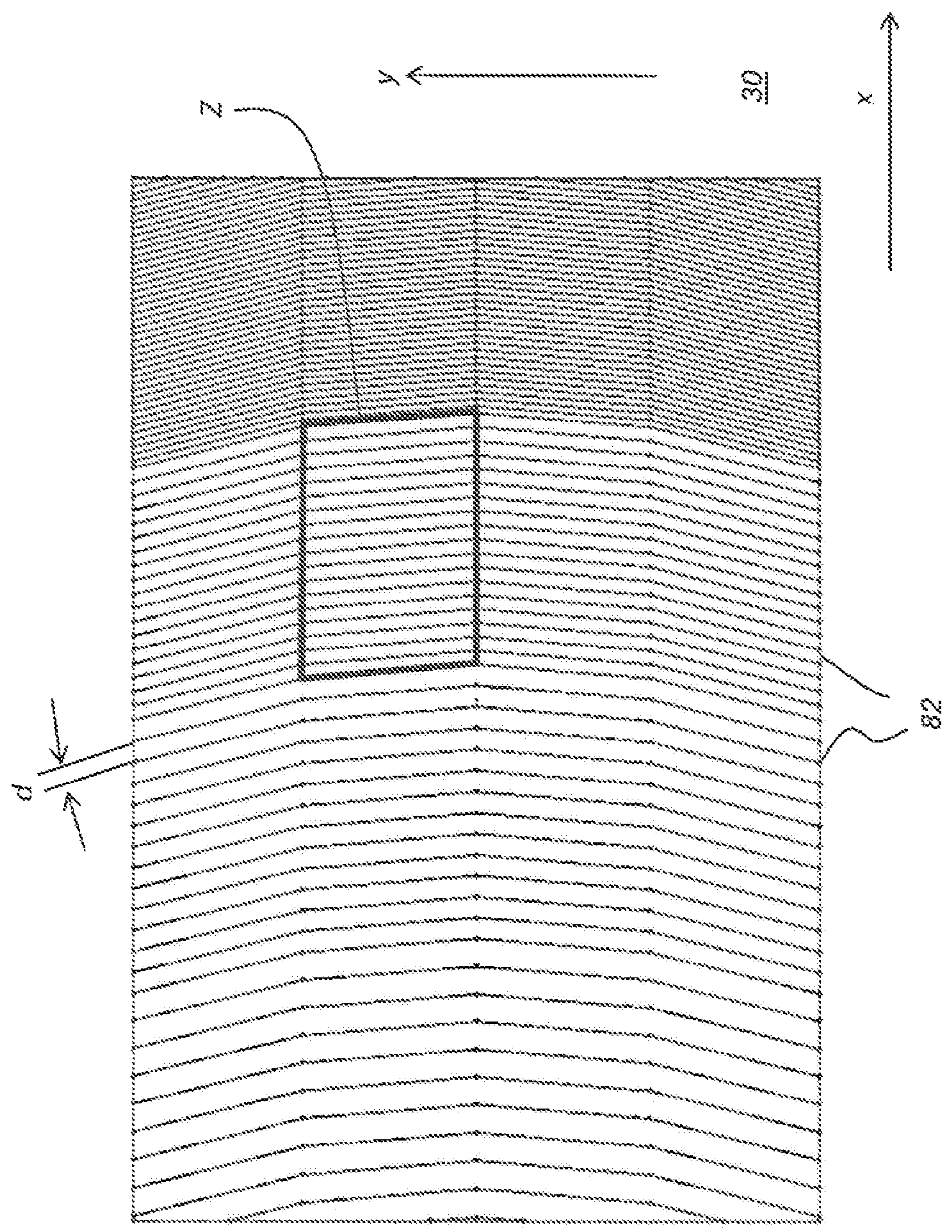

FIG. 7A is front view of a portion of an out-coupling diffractive optic outlining a single zone within a zone-segmented pattern defined by parallel diffractive features of equal pitch.

Figure 7B:
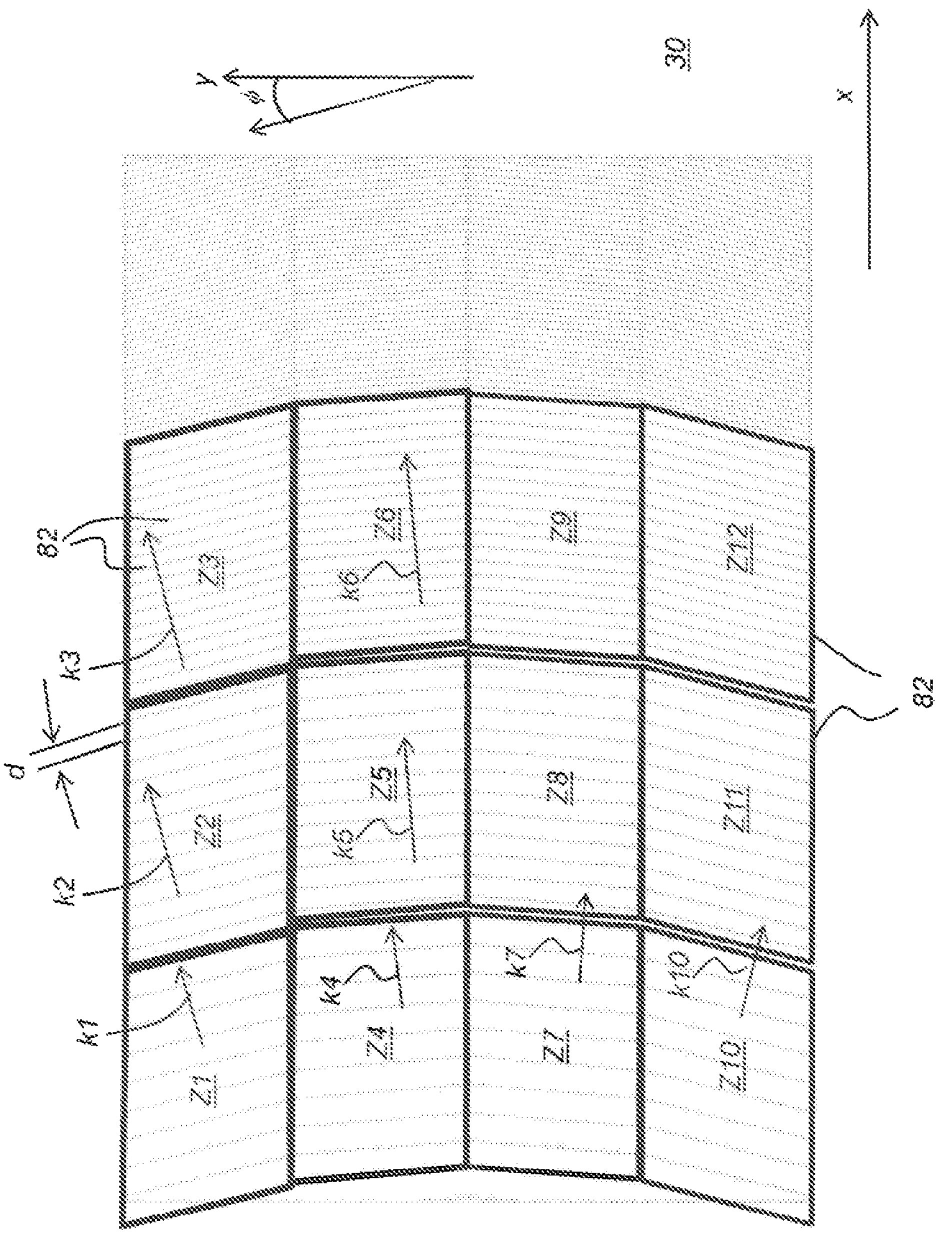

FIG. 7B is front view of the same portion of the out-coupling diffractive optic featuring an array of outlined zones, each with parallel diffractive features of equal pitch, but with the respective zones varying in pitch along one dimension of the array and varying in orientation angle along another dimension of the array.

Figure 7C:
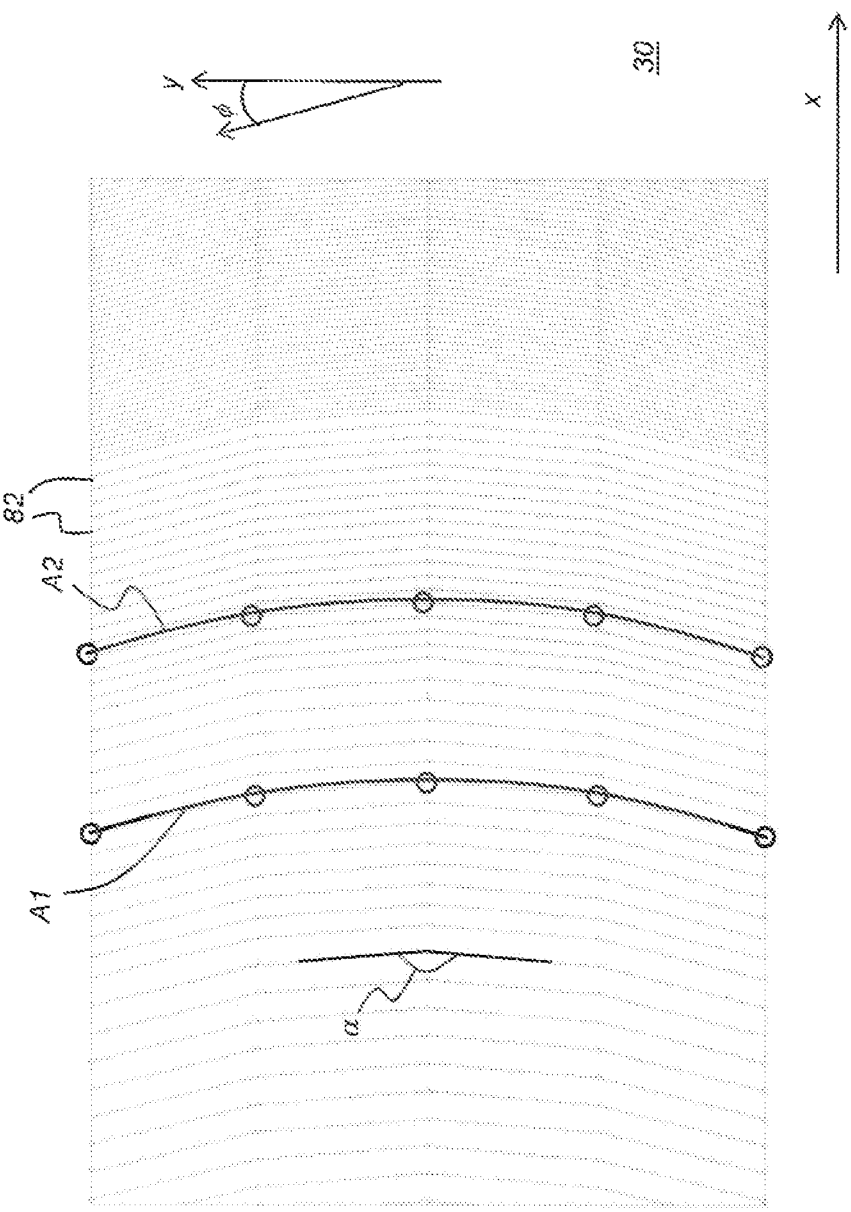

FIG. 7C is a front view of the same portion of the out-coupling diffractive optic showing alignments between the diffractive features of adjacent zones that progressively vary in orientation.

Figure 7D:
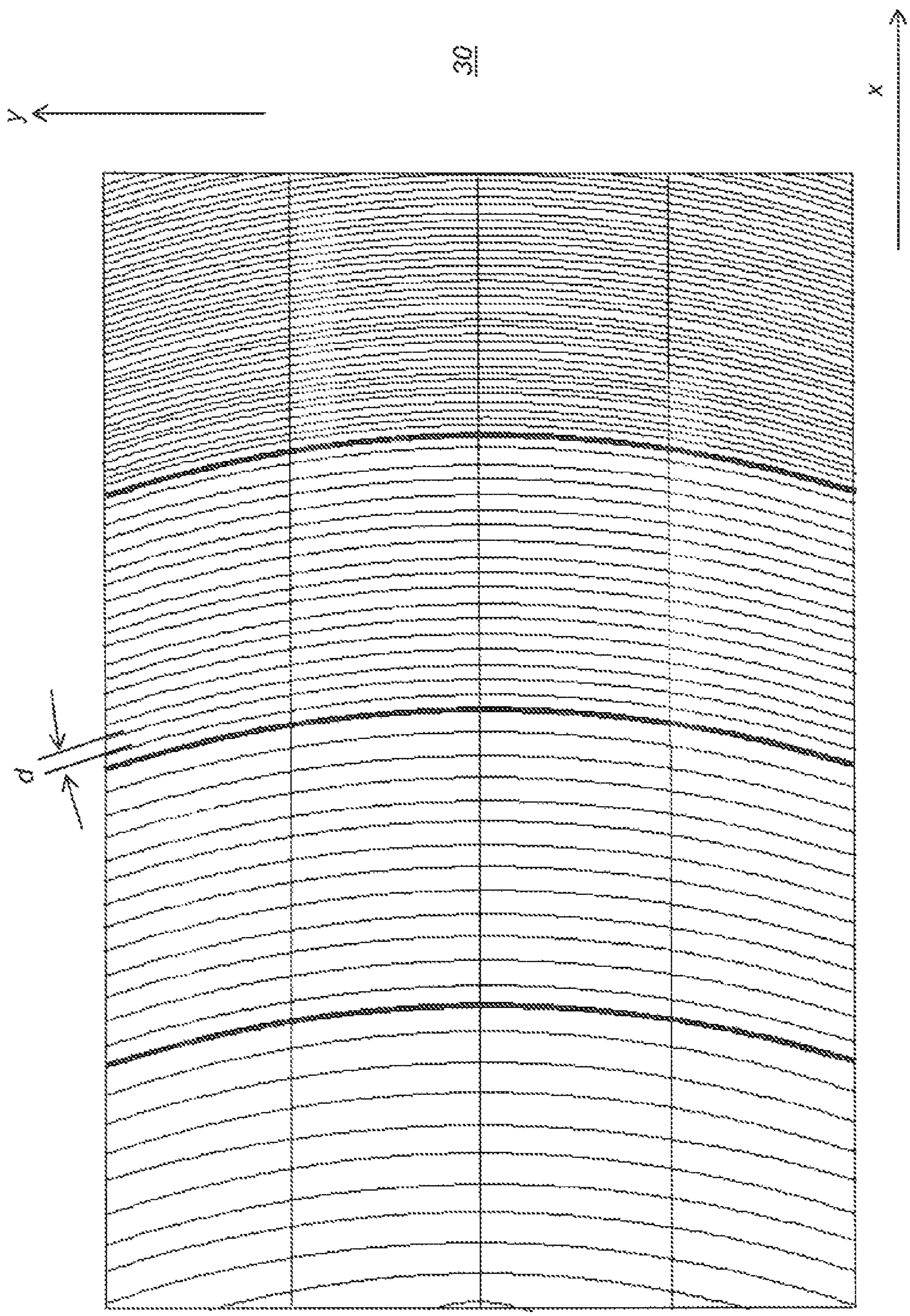

FIG. 7D is front view of a portion of an out-coupling diffractive optic having arcuate-shaped grating arranged in zones of equal pitch.

Figure 7E:
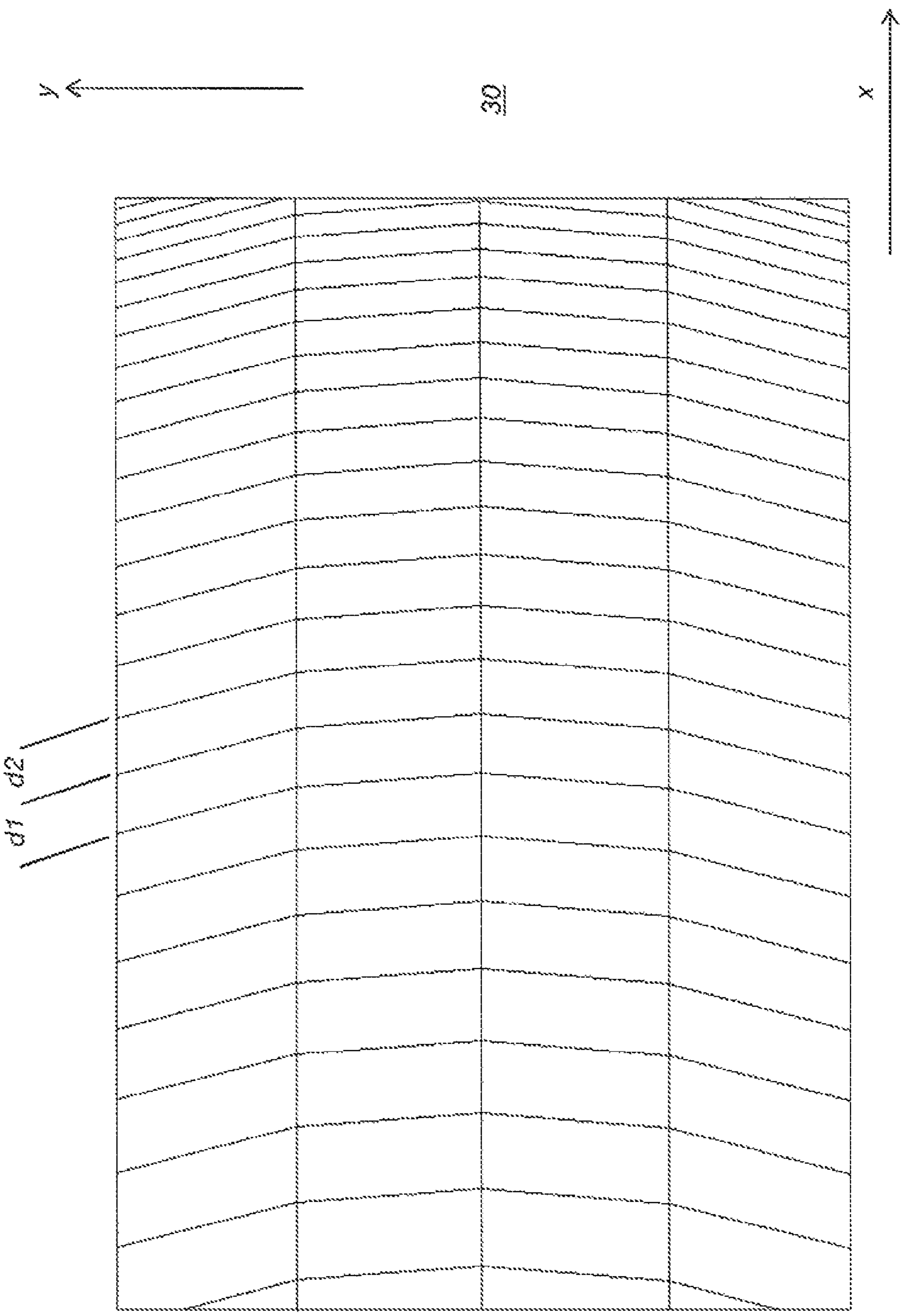

FIG. 7E is front view of a portion of an out-coupling diffractive optic having linear diffractive features arranged in zones where the diffractive features are oriented in common.

Figure 8:
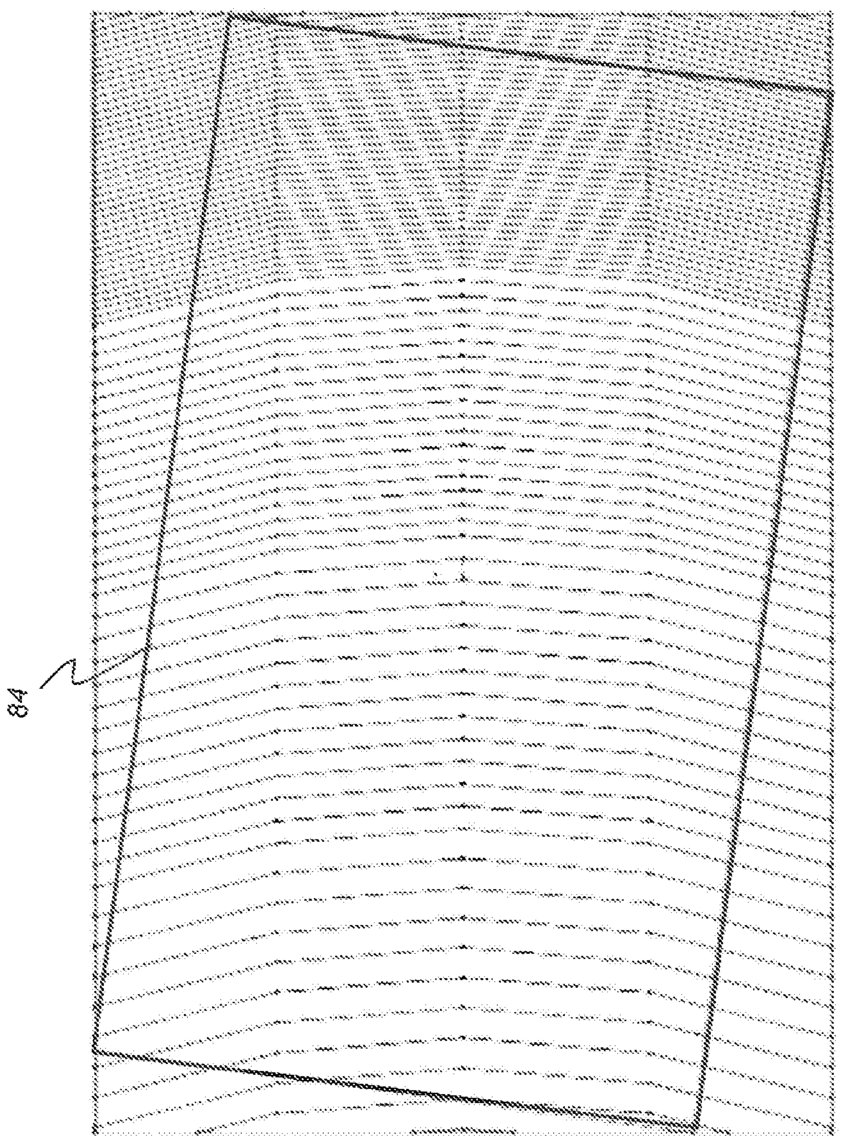

FIG. 8 is a front view of a similar diffractive optic formed by a two-dimensional array of zones in which an outline is superimposed to show a possible orientation of an out-coupling diffractive optic with respect to the two-dimensional array of zones.

Figure 9:
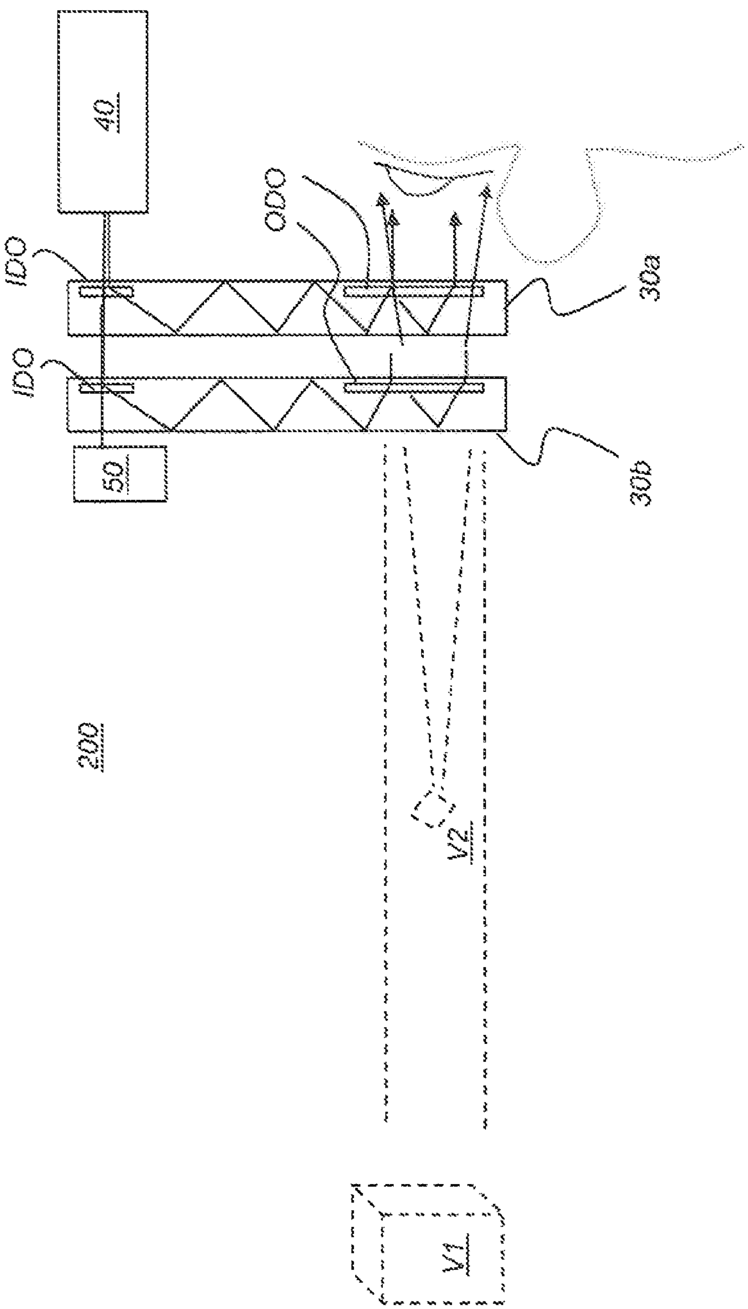

FIG. 9 is a schematic diagram showing a top view of a dual focus imaging apparatus in which one image light guide is arranged for focusing virtual images at infinity and another image light guide is arranged for focusing virtual images at a near focus within the same eyebox using an array of zones as shown in the preceding figures.

Figure 10:
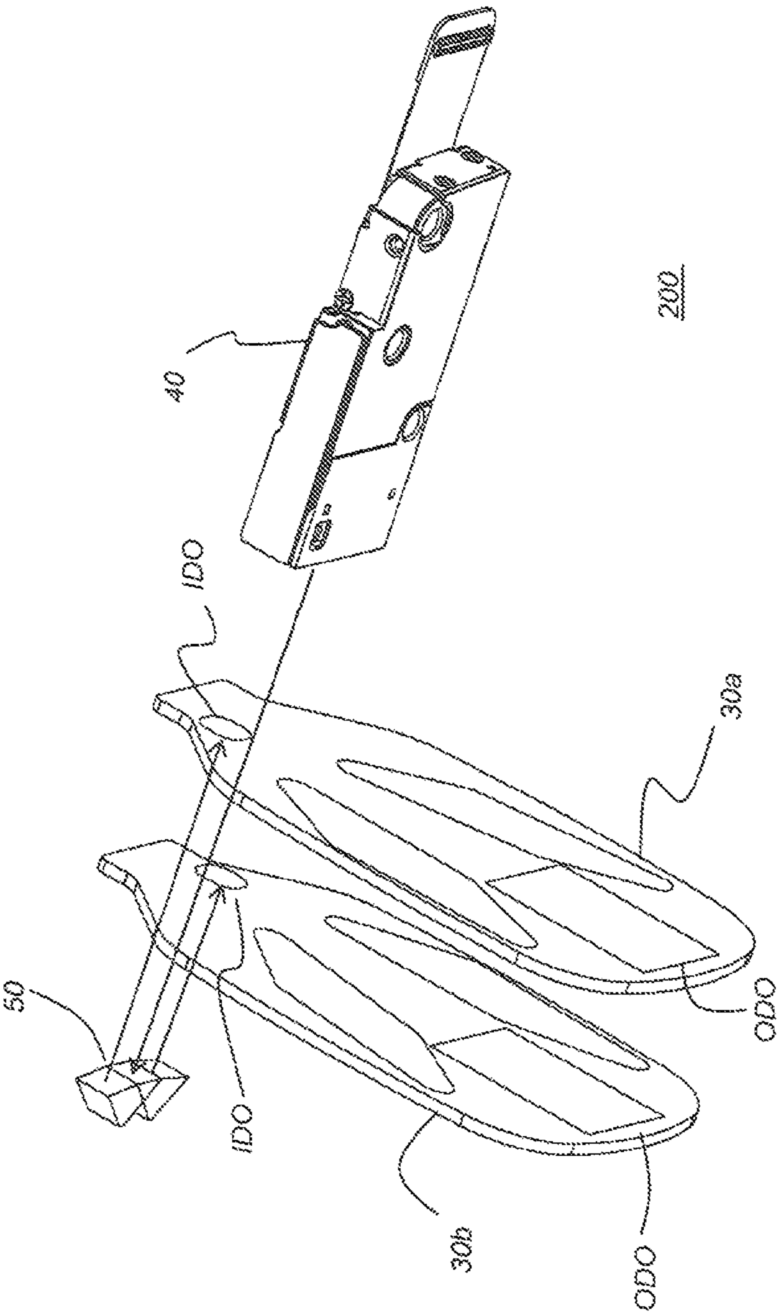

FIG. 10 is an exploded perspective view of a dual focus imaging apparatus providing separate inputs to the two image light guides.

Figure 11:
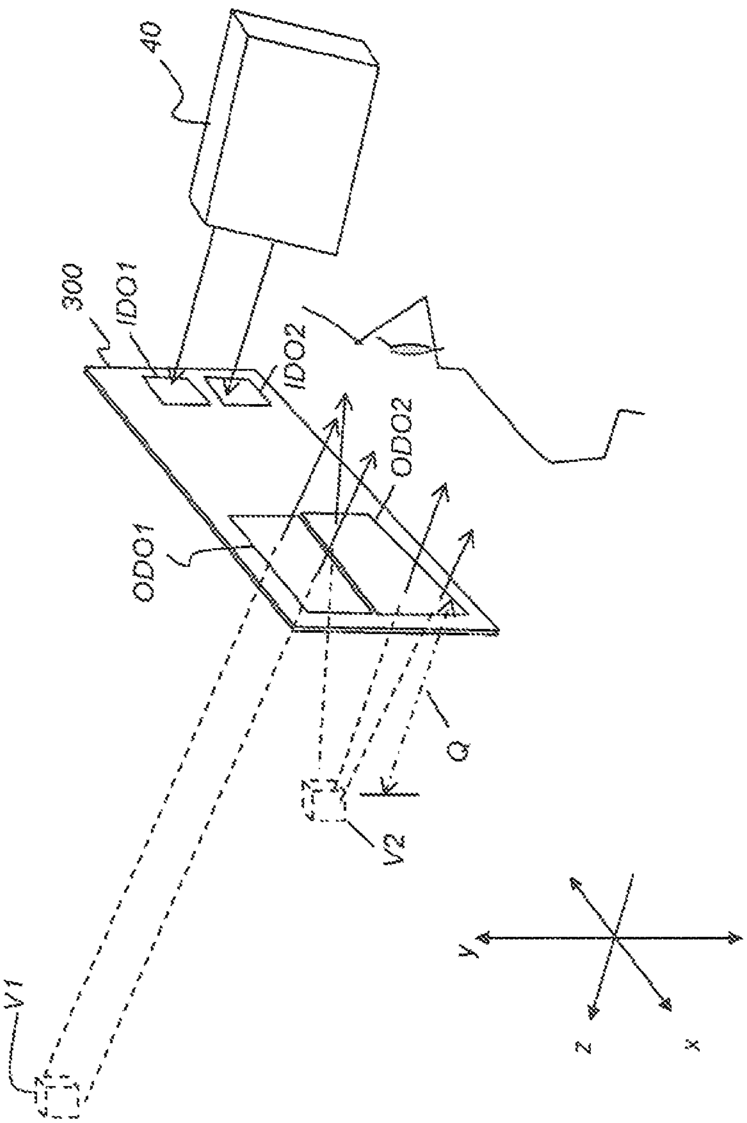

FIG. 11 is a perspective view of a dual focus imaging apparatus within the same image light guide in a bifocal arrangement.

Figure 12:
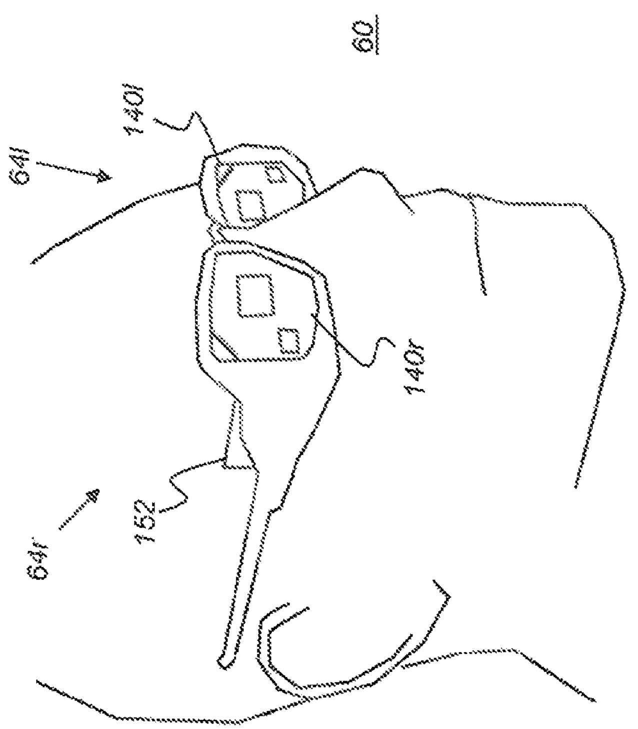

FIG. 12 is a perspective view of a binocular display system for augmented reality viewing using at least one near-focus image light guide of the present disclosure.

DETAILED DESCRIPTION OF THE INVENTION

The present description is directed in particular to elements forming part of, or cooperating more directly with, apparatus in accordance with embodiments of the invention. It is to be understood that elements not specifically shown or described may take various forms known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

By "exemplary" is meant to be "an example of", not intended to suggest any preferred or ideal embodiment.

In the context of the present disclosure, the terms "viewer", "operator", "observer", and "user" are considered to be equivalent and refer to the person who views virtual images conveyed by one of the considered image light guides, especially as arranged in an HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

As an alternative to real image projection, an optical system can produce a virtual image that is apparent to the eye of a viewer. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates the need to compensate for screen artifacts, as may be necessary when projecting a real image.

The phrases "optical infinity" and "at infinity" as used herein correspond to conventional usage in the camera and imaging arts, indicating image formation using one or more bundles of substantially collimated light, so that the focus distance exceeds at least about 4 meters.

The terms "coupled" or "coupler" in the context of optics refer to a connection by which light travels from one optical medium or device to another optical medium or device through an intermediate structure that facilitates the connection.

The terms "beam expander" and "pupil expander" are considered synonymous and are used interchangeably herein. These terms are used generally herein to refer to enlarging the area of overlap among angularly related beams for conveying virtual images.

A composite prism is formed from two or more component prism elements in a defined relationship, including those that are joined in direct optical contact or through an intervening optical medium.

Figure 1:
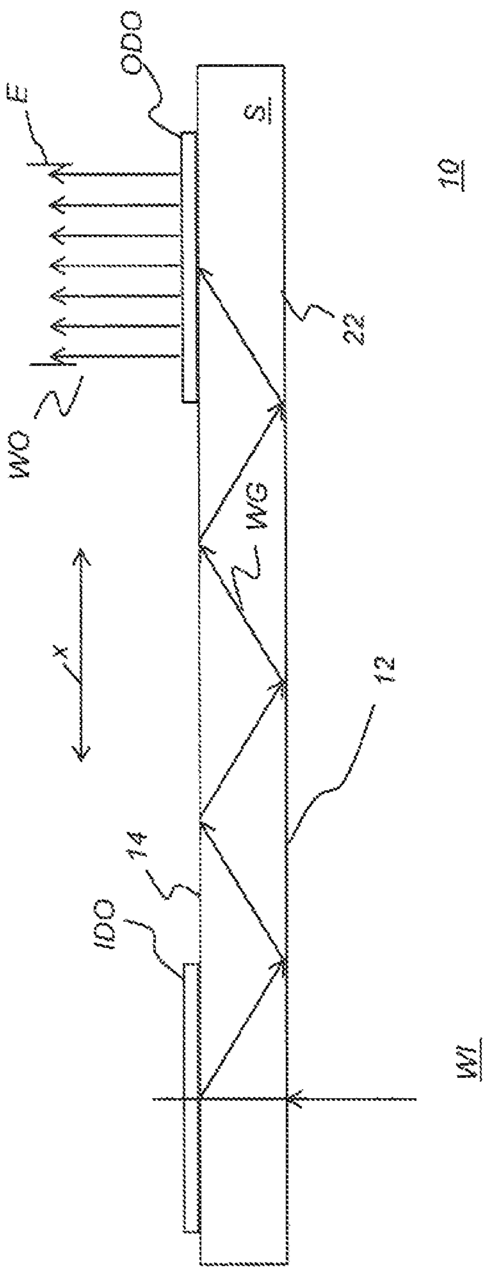
FIG. 1 is a schematic diagram showing a simplified cross-sectional view of an image light guide for conveying a virtual image with an out-coupling diffractive optic providing pupil expansion along one dimension of the virtual image.

FIG. 1 is a schematic diagram showing a simplified cross-sectional view of one conventional configuration of a monocular type image light guide 10 comprising a planar waveguide 22 having plane-parallel surfaces, an in-coupling diffractive optic IDO, and an out-coupling diffractive optic ODO arranged on a transparent substrate S of the planar waveguide 22. In this example, in-coupling diffractive optic IDO is shown as a reflective type diffraction grating arranged on an inner surface 14 of the planar waveguide 22 opposite to the outer surface 12 of the planar waveguide 22 through which image-bearing light WI approaches the planar waveguide 22. However, in-coupling diffractive optic IDO could alternately be a transmissive diffraction grating, volume hologram or other holographic diffraction element, or other type of optical component that provides diffraction for the incoming, image-bearing light WI. The in-coupling diffractive optic IDO can be located on the outer or inner surface 12 or 14 of the planar waveguide 22 and can be of a transmissive or reflective type in a combination that depends upon the direction from which the image-bearing light WI approaches the planar waveguide 22.

When used as a part of a virtual display system, in-coupling diffractive optic IDO couples the image-bearing light WI from a real, virtual or hybrid image source (not shown) into the substrate S of the planar waveguide 22. Any real image or image dimension is first converted, e.g. converged toward a focus, into an array of overlapping angularly related beams encoding the different positions within the image similar to a virtual image for presentation to the in-coupling diffractive optic IDO. The image-bearing light WI is diffracted (generally through a first diffraction order) and thereby redirected by in-coupling diffractive optic IDO into the planar waveguide 22 as image bearing light WG for further propagation along the planar waveguide 22 by Total Internal Reflection (TIR). Although diffracted into a generally more condensed range of angularly related beams in keeping with the boundaries set by TIR, the image-bearing light WG preserves the image information in an encoded form. An out-coupling diffractive optic ODO receives the encoded image bearing light WG and diffracts (also generally through a first diffraction order) the image bearing light WG out of the planar waveguide 22 as the image bearing light WO toward the intended location of a viewer's eye. Generally, the out-coupling diffractive optic ODO is designed symmetrically with respect to the in-coupling diffractive optic IDO to restore the original angular relationships of the image-bearing light WI among outputted angularly related beams of the image-bearing light WO. However, to increase one dimension of overlap among the angularly related beams in a so-called eyebox E within which the virtual image can be seen, the out-coupling diffractive optic ODO is arranged to encounter the image bearing light WG multiple times and to diffract only a portion of the image bearing light WG on each encounter. The multiple encounters along the length of the out-coupling diffractive optic ODO have the effect of enlarging one dimension of each of the angularly related beams of the image bearing light WO thereby expanding one dimension of the eyebox E within which the beams overlap. The expanded eyebox E decreases sensitivity to the position of a viewer's eye for viewing the virtual image.

The out-coupling diffractive optic ODO is shown as a transmissive type diffraction grating arranged on the inner surface 14 of the planar waveguide 22. However, similar to the in-coupling diffractive optic IDO, the out-coupling diffractive optic ODO can be located on the outer or inner surface 12 or 14 of the planar waveguide 22 and be of a transmissive or reflective type in a combination that depends upon the direction through which the image-bearing light WG is intended to exit the planar waveguide 22.

Figure 2:
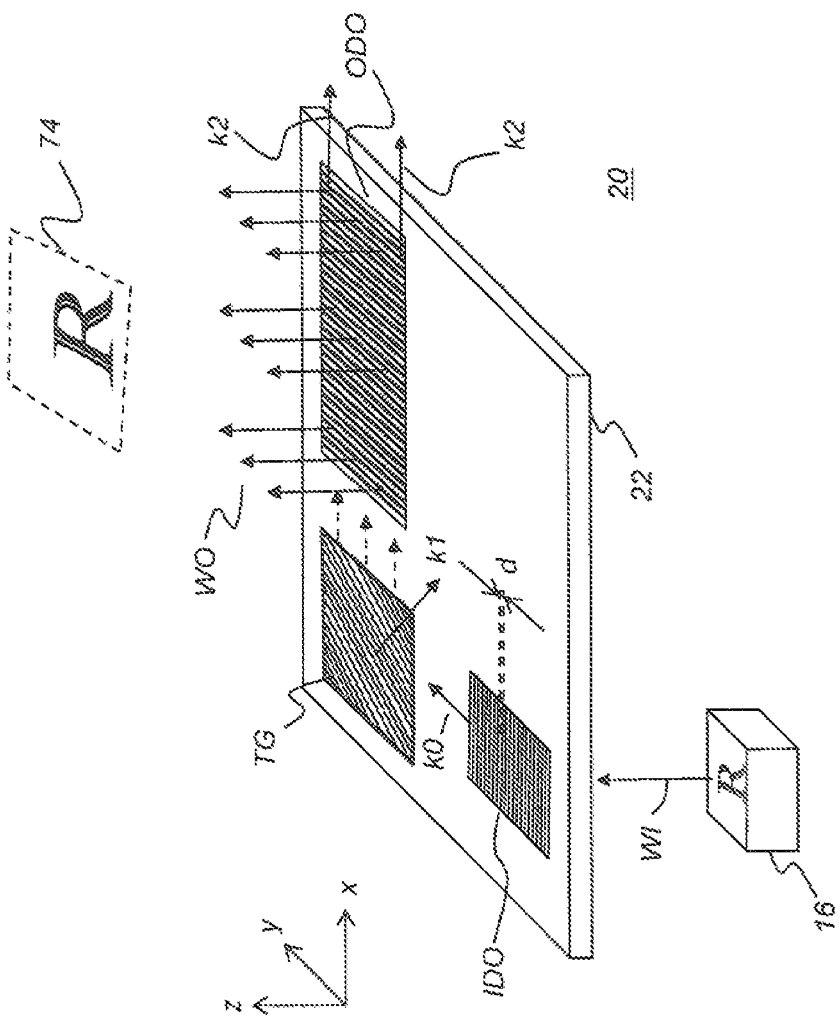
FIG. 2 is a schematic diagram showing a perspective view of an image light guide for conveying a virtual image with a turning grating in addition to an out-coupling diffractive optic providing pupil expansion along two dimensions of the virtual image.

The perspective view of FIG. 2 shows an image light guide 20 that is arranged for expanding the eyebox 74 in two dimensions, i.e., along both x- and y-axes of the intended image. To achieve a second dimension of beam expansion, the in-coupling diffractive optic IDO is oriented to diffract the image bearing light WG about a grating vector k0 toward an intermediate turning grating TG, whose grating vector k1 is oriented to diffract the image bearing light WG in a reflective mode toward the out-coupling diffractive optic ODO. Only a portion of the image bearing light WG is diffracted by each of multiple encounters with intermediate turning grating TG thereby laterally expanding each of the angularly related beams of the image bearing light WG approaching the out-coupling diffractive optic ODO. The turning grating TG redirects the image bearing light WG into an at least approximate alignment with a grating vector k2 of the out-coupling diffractive optic ODO for longitudinally expanding the angularly related beams of the image bearing light WG in a second dimension before exiting the planar waveguide 22 as the image bearing light WO. Grating vectors, such as the depicted grating vectors k0, k1, and k2, extend in a direction that is normal to the diffractive features (e.g., grooves, lines, or rulings) of the diffractive optics and have a magnitude inverse to the period or pitch d (i.e., the on-center distance between grooves) of the diffractive optics IDO, TG, and ODO.

In the image light guide 20 of FIG. 2, in-coupling diffractive optic IDO receives the incoming image bearing light WI containing a set of angularly related beams corresponding to individual pixels or equivalent locations within an image generated by an image source 16. A full range of angularly encoded beams for producing a virtual image can be generated by a real display together with focusing optics, by a beam scanner for more directly setting the angles of the beams, or by a combination such as a one-dimensional real display used with a scanner. The image light guide 20 outputs an expanded set of angularly related beams in two dimensions of the image by providing multiple encounters of the image bearing light WG with both the intermediate turning grating TG and the out-coupling diffractive optic ODO in different orientations. In the given orientation of the planar waveguide 22, the intermediate grating TG provides beam expansion in the y-axis direction, and the out-coupling diffractive optic ODO provides a similar beam expansion in the x-axis direction. The reflectivity characteristics and respective periods d of the two diffractive optics IDO and ODO and the intermediate grating TG, together with the orientations of their respective grating vectors, provide for beam expansion in two dimensions while preserving the intended relationships among the angularly related beams of the image bearing light WI that are output from the image light guide 20 as the image bearing light WO.

That is, while the image bearing light WI input into the image light guide 20 is encoded into a different set of angularly related beams by the in-coupling diffractive optic IDO, the information required to reconstruct the image is preserved by accounting for the systematic effects of the in-coupling diffractive optic IDO. The turning grating TG, located in an intermediate position between the in-coupling and out-coupling diffractive optics IDO and ODO, is typically arranged so that it does not induce any significant change on the encoding of the image bearing light WG. The out-coupling diffractive optic ODO is typically arranged in a symmetric fashion with respect to the in-coupling diffractive optic IDO, e.g., including diffractive features sharing the same period. Similarly, the period of the turning grating TG also typically matches the common period of the in-coupling and out-coupling diffractive optics IDO and ODO. Although the grating vector k1 of the turning grating TG is shown oriented at 45 degrees with respect to the other grating vectors, which remains a possible orientation, the grating vector k1 of the turning grating TG is preferably oriented at 60 degrees to the grating vectors k0 and k2 of the in-coupling and out-coupling diffractive optics IDO and ODO in such a way that the image bearing light WG is turned 120 degrees. By orienting the grating vector k1 of the intermediate turning grating at 60 degrees with respect to the grating vectors k0 and k2 of both the in-coupling and out-coupling diffractive optics IDO and ODO, the grating vectors k0 and k2 of the in-coupling and out-coupling diffractive optics IDO and ODO are also oriented at 60 degrees with respect to each other. Basing the grating vector magnitudes on the common pitch of the turning grating TG and the in-coupling and out-coupling diffractive optics IDO and ODO, the three grating vectors k0, k1, and k2 form an equilateral triangle, and sum to a zero magnitude, which avoids asymmetric effects that could introduce unwanted aberrations including chromatic dispersion.

The image-bearing light WI that is diffracted into the planar waveguide 22 is effectively encoded by the in-coupling optic, whether the in-coupling optic uses gratings, holograms, prisms, mirrors, or some other mechanism. Any reflection, refraction, and/or diffraction of light that takes place at the input must be correspondingly decoded by the output in order to re-form the virtual image that is presented to the viewer. Preferably, the turning grating TG, placed at an intermediate position between the in-coupling and out-coupling diffractive optics IDO and ODO, is typically designed and oriented so that it does not induce any change on the encoded light. Out-coupling diffractive optic ODO decodes the image bearing light WG into its original or desired form of angularly related beams that have been expanded to fill the eyebox 74. In a broader sense, whether any symmetries are maintained or not among the turning grating TG and the in-coupling and out-coupling diffractive optics IDO and ODO or whether or not any change to the encoding of the angularly related beams of the image bearing light WI takes place along the planar waveguide 22, the turning grating TG and the in-coupling and out-coupling diffractive optics IDO and ODO are related so that the image bearing light WO that is output from the planar waveguide 22 preserves or otherwise maintains the original or desired form of the image bearing light WI for producing the intended virtual image.

The letter "R" represents the orientation of the virtual image that is visible to the viewer whose eye is in the eyebox 74. As shown, the orientation of the letter "R" in the represented virtual image matches the orientation of the letter "R" as encoded by the image bearing light WI. A change in the rotation about the z axis or angular orientation of incoming image bearing light WI with respect to the x-y plane causes a corresponding symmetric change in rotation or angular orientation of outgoing light from out-coupling diffractive optic (ODO). From the aspect of image orientation, the turning grating TG simply acts as a type of optical relay, providing expansion of the angularly encoded beams of the image bearing light WG along one axis (e.g., along the y axis) of the image. Out-coupling diffractive optic ODO further expands the angularly encoded beams of the image bearing light WG along another axis (e.g., along the x axis) of the image while maintaining the original orientation of the virtual image encoded by the image bearing light WI. The turning grating TG is typically a slanted or square grating or, alternately, can be a blazed grating and is typically arranged on the front or back surfaces of the planar waveguide 22.

The image light guides 10 and 20 depicted in FIGS. 1 and 2 can be of a type used in a number of existing head-mounted device (HMD) designs for providing image content to a viewer. This type of image light guide is particularly well-suited to augmented reality applications in which virtual image content can be superimposed on a real-world view as seen through the transparent planar waveguide 22.

Conventional virtual imaging systems based on image light guides that convey virtual images to expanded eyeboxes from offset image sources present the virtual images at an optical infinity focus. That is, each of the angularly related beams that comprise the image bearing light within the eyebox remains in a substantially collimated form. As schematically represented in FIGS. 3A, 3B, and 3C, image content produced by a projector 40 and conveyed by the image light guide 30 through the in-coupling and out-coupling diffractive optics IDO and ODO appears to a viewer's eye as a virtual image V1 located well in front of the image light guide 30 at an infinity focus. The apparent size of the virtual image within the viewer's field of view relates to the ranges of angles through which the angularly related beams encode the image. The solid lines exiting the out-coupling diffractive optic ODO represent one of the collimated beams of the image bearing light WO, and the dashed lines represent a virtual extension of the one collimated beam in front of the image light guide 30 corresponding to a pixel of the virtual image that appears to emanate from a source located at infinity.

In FIGS. 4A-4C, a modification is made to the arrangement of the image light guide 30, such that the principal rays from a point within the virtual image V2 appear to emerge from a location at a finite near-focus distance Q in front of the image light guide 30. Thus, each of the angularly related beams of the image bearing light is no longer collimated, i.e., diverging from a point at infinity, but is instead a beam that appears to diverge from a point located much closer to the image light guide 30. The diverging principal rays of the near-focus point formed by the light rays exiting from the image light guide 30 are indicated in solid lines. The dashed lines are extensions of the principal rays that indicate, to the eye of the viewer, the apparent source of the object point in the virtual image.

Virtual image content that appears to be at a shorter focus distance than the conventional infinity focus provides additional control over the way in which virtual images can be presented to viewers such as by presenting images of objects at a perceived distance in front of other objects within the viewer's field of view. Near or finite focal distance Q can be at any distance within about 1 meter to 2 meters, such as at about 0.6 m from the image light guide 30, for example. In order to form a virtual image that appears to have a finite focal distance, each of the angularly related beams of the image bearing light that is emitted from the out-coupling diffractive optic ODO has its principal rays diverging from the apparent location within the virtual image that is positioned at the near focus distance Q. The near focusing of each of the otherwise collimated beams among the set of angularly related beams does not change the relative positions at which the beams appear to be focused within the virtual image. Instead, the entire virtual image appears closer to the viewer One mechanism for converting a dimension of a collimated beam propagating along the planar waveguide 22 into a diverging beam representing a near focus position in a virtual image is presented in FIG. 5 as a stepped-chirp diffraction grating 80 operating in a reflective mode. Grating vector k2 extends parallel to the x axis but in a direction opposite to the direction along which the collimated beam is propagated. The grating period d of the out-coupling grating 80 increases in a stepwise manner along the same direction of propagation. Since the angle through which a given beam is diffracted is inversely proportional to the period of a grating, the angle through which the collimated beam is diffracted decreases with successive encounters of the collimated beam along the stepped-chirp diffraction grating 80. At the start of the out-coupling grating ODO first encountered by the collimated beam, the period d is relatively shortened so that the diffraction angle is increased and at the end of the grating ODO, the period d is relatively lengthened so that the diffraction angle is decreased.

Considered in the x-z plane, stepwise adjustments to the period d along the x-axis length of the out-coupling grating 80 provide for diffracting the representative collimated beam through progressively varying diffraction angles so that the light appears to emanate from a near-focus point f. The other angularly related beams of the image bearing light WG are also diffracted through a progression of different diffraction angles with each successive encounter with the out-coupling grating 80 so that the light from each of these beams appears to emanate from a different near-focus point elsewhere in a common focal plane at the distance Q in accordance with their differing angular content.

Another mechanism for converting a different dimension of a collimated beam propagating along the planar waveguide 22 into a diverging beam representing a near focus position in a virtual image is presented in FIGS. 6A and 6B, which depict a portion of a reflective diffractive optic featuring a zone-segmented pattern having an angular variation between the zones generally along a y-axis dimension of the diffractive optic. For simplicity, the grating period d along the x-axis direction is held constant to emphasize the effect of a stepped variation in the angular orientation of the diffractive features, which are also referred to herein as grating features. Referring to FIG. 6A, progressive redirection of the angularly related beams in the y-z plane can be effected by changing an angle φ of grating features 82 within the x-y plane of the planar waveguide 22. Measured against the y axis, the angle φ of the grating features 82 varies in a stepwise fashion along the y axis as cords of a continuous curve. The grating features 82 angularly depart from the y axis orientation in a stepwise fashion with distance from a centerline of the grating along the x axis but the angular departures change in sign on opposite sides of the centerline. Instead of diffracting individual beams through a progression of different angles associated with successive encounters with the out-coupling grating 80, the already expanded beams in the y dimension from the turning grating TG are diffracted through a progression of angles β in the y-z plane as a function of position along the y axis. Thus, considered in the y-z plane, each of the angularly related beams of the image bearing light WG appears to emanate from a unique near-focus point f at the distance Q from the image light guide.

FIG. 6B depicts two rays of a given collimated beam encoding a single pixel of a virtual image. A central ray R1 of the given beam propagates generally in alignment with a grating vector k1 of a zone that extends generally along an x-axis dimension of the diffractive optic. Upon each encounter with one of the grating features 82, a portion of the light traveling in this direction is diffracted according to the grating vector k1 in a direction generally within the x-z plane at an inclination angle to the z axis. The angular amount by which the central ray R1 is diffracted to reach the desired inclination angle (shown here as coincident with the z axis) is governed largely by its initial angular orientation, wavelength, and the grating period d. Another ray R1' of the same beam propagating in the same direction as the ray R1 but offset in the y-axis direction encounters a different zone of grating elements that are oriented as defined by a grating vector k1', which is angularly oriented in the x-y plane with respect to the vector k1, as well as the rays R1 and R1', through angle cp. Each successive encounter of the beam portion propagating generally in the direction of the ray R1' with the relatively inclined grating features 82 of the zone diffracts at least a portion of the light into the y-z plane. The inclination angle β represents the angular component of the diffracted light in the y-z plane. Although accomplished in a stepwise manner, the inclination angle φ is progressively changed so that in the y-z plane, the differently diffracted portions of each angularly encoded beam appear to emanate from a focal point in a near focal plane. The components and angles through which the various angularly related beams are diffracted can be calculated according to the rules for conical diffraction.

FIGS. 7A, 7B, and 7C show, in simplified schematic form, a portion of an out-coupling diffractive optic that is divided into a two-dimensional array of zones Z, which combine a stepwise variation in pitch along the x-axis dimension of the array with a stepwise variation in the orientation of the grating features in the y-axis dimension of the array. Each of the zones includes a set of linear grating features, which extend parallel to each other and have equal pitch. Thus, each zone has the form of a conventional linear grating. However, successive zones along the x-axis dimension of the array and referred to in the array as a row have respective sets of parallel grating features that extend in the same direction but have different periods d (i.e., different pitch). Successive zones along the y-axis dimension of the array and referred to in the array as a column have respective sets of parallel grating features that extend in progressively different directions through angle cp.

Each of the zones Z, as shown numbered Z1 through Z12 in FIG. 7B, has the shape of a parallelogram having parallel top and bottom sides spaced apart through a distance corresponding to the length of linear grating features 82 and also having parallel left and right sides spaced apart through a distance corresponding to a product of the number of grating features 82 and period d of each of the equally spaced linear grating features 82.

The linear diffractive grating features 82 within each zone Zn extend in parallel, and the linear diffractive grating features 82 within each of the zones of a row also extend in parallel. Thus, grating vectors k of the zones within each row extend in parallel. However, within each row, the grating pitch (period d) progressively varies in a stepwise manner among the zones of each row. Thus, the magnitudes of the grating vectors k progressively vary along each row. For example, as shown in FIG. 7B, the grating vectors k1, k2, and k3 of contiguous zones Z1, Z2, and Z3 in the same row all extend in the same direction but at different lengths. Similarly, grating vectors k4, k5, and k6 of contiguous zones Z4, Z5, and Z6 extend in the same direction but at different lengths. A similar observation can be made among the grating vectors of the zones Z7, Z8, and Z9 and the zones Z10, Z11, and Z12 of the other depicted rows.

Among the zones of each column, the grating vectors progressively change in angular orientation in a stepwise manner through the angle cp. While the displacements between grating features 82 in the x-axis direction remain constant among the zones within each of the columns, the pitch itself varies as a product of the x-axis displacement and the cosine of angle φ. Thus, the angular orientations of the grating vectors k1, k4, k7, and k10 vary in angle φ a stepwise manner between the contiguous zones Z1, Z4, Z7, and Z10 of a column and the magnitudes of these grating vectors k1, k4, k7, and k10 vary as a function of a constant x-axis displacement of the grating features within the column and the cosine of angle φ. A similar observation can be made among the grating vectors of the zones Z2, Z5, Z8, and Z11 and the zones Z3, Z6, Z9, and Z12 of the other depicted columns.

While the zones of each row include upper and lower boundaries that are all aligned in parallel to a common axis, i.e. the x axis, the zones in each column are aligned along a respective arc. For example, the zones along two columns of the out-coupling diffractive optic of FIG. 7C are shown in alignment with arcs A1 and A2. As shown for two representative arcs A1 and A2 in FIG. 7C, each linear grating feature segment that extends between the upper and lower boundaries of a zone can be considered as a chord to along an arc. The arcs, e.g., A1 and A2, of the different columns within the diffractive optic share the same curvature and are distinguished by different offsets along the x-axis direction. Although the parallel linear grating features 82 between the adjacent zones within the individual columns are oriented in different directions, the shared x-axis displacements of the grating features in the adjacent zones within each column allow the parallel grating features of the adjacent zones to precisely abut. Thus, the effective forward surfaces of the grating features within each zone of a column intersect with the effective forward surfaces of the grating features of an adjacent zone within the same column, and the effective rearward surfaces of the grating features within each zone of a column intersect with the effective rearward surfaces of the grating features of an adjacent zone within the same column. The included angle α between the grating features at each intersection is the supplementary angle to the angular difference between the angular orientations of the grating features of the adjacent zones of the column. Thus, the grating features of each column form a chordal representation of an arc. Superscribed arcs having these chords are offset between the columns of zones but share the same curvature and are thus not concentric.

As will be recognized by those skilled in the grating fabrication arts, the zoned arrangement of the ODO diffraction grating shown in FIGS. 7A-7C provides a succession patterns that can be fabricated in practice, without placing highly compute-intensive demands on e-beam or other processing systems. Although the zones differ from one another in at least one of pitch and orientation, the pitch and orientation within any given zone remain constant. Thus, each zone can be easily replicated and matched to its adjacent zones that only vary in pitch and orientation, with the zones in each row sharing the same orientation and the zones of each column sharing the same x-axis displacements between grating features.

An alternative approach as shown in FIG. 7D fashions the grating features with arcuate shapes having a common curvature across the multiple zones. Similar to the zones described above, the arcuate grating features within each zone share the same pitch and orientation. However, in place of a common linear form, i.e., infinite curvature, the arcuate grating features of all of the zones share a common finite curvature. The single arcuate shaped grating features are also easier to fabricate with the grating features between the zones of each row differing only in pitch. Given the common curvature of the grating segments, their alignment in each column, and their varying orientation, the grating features of each column form a true arc. Both within and between the columns, these true arcs formed by the grating features share the same curvature. The arcs, whether between grating features within or between columns, differ only in offset along the x-axis direction. Thus, the x-axis displacements between the grating features remain constant among the zones of each column.

While the zonal arrays can have multiple zones along each row and column, the grating features such as shown in FIG. 7D can be fashioned with a single row and multiple columns. Within each column, the grating features can be scribed by the same arcs that are offset by the same amount along the x axis. The columns differ from one another by the offset between adjacent grating features, such that each different column exhibits a different offset along the x axis. The offset between the arcuate grating features varies in a stepwise fashion between the columns.

Conversely, the zonal arrays can be fashioned as shown in FIG. 7E with a single column and multiple rows. Here, each row includes a series of linear grating features having the same orientation but with a progressively varying pitch. Although each different row is scribed by grating lines in a different orientation and the pitch spacing progressively varies along each row, the differently oriented grating lines of the different rows progressively vary in spacing by the same amount along the x axis. Thus, the grating features in each of the rows can be scribed with the same progressive index pattern in the x-axis direction and differ only in the orientation of the grating features between the different rows.

While the zonal arrays have been presented in simplified and symmetric forms for emphasizing manufacturing expedience, other including higher order variations can be superimposed to achieve various performance objectives. These variations known in the art of diffractive optics can include variations in the form or substance of the grating features and their distribution within and between the zones.

For the purpose of providing highly resolved image content, the size and number of stepwise varying zones in the array is set to focus each of the angularly related beams at a virtual unique near focus spot that is sized to significantly limit or avoid overlap with the virtual focus spots of the other angularly related beams in the eyebox. Preferably, each of the focus spots spreads over an area less than the size of about 0.5 pixels. For example, where the field of view (FOV) is 100 degrees and with a display generates 1000 pixels across the FOV, each pixel is separated by 0.1 degrees. Therefore, the angular step, for example, associated with the changing orientation angle φ between zones of adjacent rows is preferably limited to less than 0.05 degrees.

The angular step associated with the changing x-axis displacements of the grating features between the zones of adjacent columns is preferably similarly limited.

As depicted for example in FIG. 8, the overall shape of an assembled array can be skewed with respect to the more regular x-y axis of orientation of the zonal array. The plan view of FIG. 8 shows an outline 84, which defines the perimeter of the fabricated ODO for one type of zoned grating arrangement. The depicted features outside of outline 84 are shown for reference only and need not be fabricated. Preferably, the grating area of the ODO is shaped to accommodate the distribution of the angularly related beams intended for diffraction to virtual near focus positions beyond the image light guide.

Dual Imaging Apparatus

Referring to the schematic view of FIG. 9 and exploded view of FIG. 10, there is shown a dual imaging apparatus 200 using a first image light guide 30*a* that forms both virtual image V1 at infinity focus and virtual image V2 at a near-focus position using an ODO that is configured as a stepped chirped diffraction grating according to an embodiment of the present disclosure. A beam separator 50 can be used to direct the appropriate scene content for infinity- and near-focused images, such as using polarization, shuttering, or other characteristic to select the appropriate light for each image light guide 30*a*, 30*b*.

The two virtual images that are formed by dual imaging apparatus 200 are located at different focal lengths. An alternate embodiment of the present disclosure can use two zoned ODO gratings to provide two focal lengths, where neither focal length is considered at optical infinity.

The perspective view of FIG. 11 shows an alternate embodiment of a dual imaging apparatus 300 that has a bifocal arrangement. An out-coupling diffractive optic ODO1 provides imaging for forming virtual image V1 at infinity focus. An out-coupling diffractive optic ODO2, configured using the zoned, stepped-chirp arrangement described herein, provides near-focus imaging to form virtual image V2. Projector 40 is configured to provide separate image content to a corresponding in-coupling diffractive optic IDO1 or IDO2. Although FIG. 11 shows pairs of in-coupling and out-coupling diffractive optic ODO, the imaging apparatus 300 arrangement could also be configured with a single in-coupling optic and one nearly continuous out-coupling optic split into an infinity-focus section and a near-focus section. Alternately, a progressive focus arrangement can be provided, with multiple sections forming the ODO, each section having different focus. The input signal from projector 40 can selectively direct image content to the IDO for each section of the ODO with its respective focus characteristic.

The perspective view of FIG. 12 shows a display system 60 for three-dimensional (3-D) augmented reality viewing using a pair of image light guides of the present disclosure. Display system 60 is shown as an HMD with a left-eye optical system 641 having an image light guide 1401 for the left eye and a corresponding right-eye optical system 64*r* having an image light guide 140*r* for the right eye. An image source 152, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided. Alternate arrangements are possible, including a display apparatus for providing an image to one eye.

Image Light Guide Fabrication

In-coupling and out-coupling diffractive optics IDO and ODO can be diffraction gratings or formed as volume holograms, or formed from a holographic polymer dispersed liquid crystal, for example. The waveguide substrate S of the image light guide is typically glass or other optical material with sufficient index of refraction for supporting TIR transmission between an in-coupling diffractive optic, distribution gratings, and an out-coupling diffractive optic.

In-coupling diffractive optics IDO, distribution or turning gratings, and out-coupling diffractive optics ODO can have different grating periods appropriate to their functions. After proper surface preparation of a glass substrate blank, the diffraction components can be formed on one or both outer surfaces of the pupil expander using nano-imprinting methods, for example. At least one of the in-couplings and out-couplings can be a surface relief diffraction grating.

In practice, it can be difficult to measure successive angular changes that define each zone Z of the ODO, particularly where high resolution is provided. Boundary portions of the ODO can be compared to indicate changes in the respective angles of the grating patterns.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An image light guide for forming a virtual image, comprising:
- a waveguide;
- an in-coupling diffractive optic arranged to direct image-bearing light beams into the waveguide;
- an out-coupling diffractive optic arranged to direct the image-bearing light beams from the waveguide toward an eyebox;
- the out-coupling diffractive optic including a multi-dimensional array of zones each comprising a set of diffractive features;
- the diffractive features within each set having a common pitch; and
- successive zones along a first dimension of the array having respective sets of diffractive features with a different common pitch that progressively varies between the successive zones in a stepwise manner, wherein the out-coupling diffractive optic is configured to form a virtual image viewable from the eyebox at a near focus distance;
- wherein the sets of diffractive features in the successive zones along the first dimension are oriented in one direction, and successive zones along a second dimension of the array have respective sets of diffractive features that are oriented in different directions in a manner that progressively varies in a stepwise manner between the successive zones along the second dimension,
- wherein the pitch of the diffractive features is constant along the second dimension of the array.

2. The image light guide of claim 1, wherein the sets of diffractive features in the successive zones along the second dimension of the array share a common shape.

3. The image light guide of claim 2, wherein the common shape is a linear or curvilinear shape.

4. The image light guide of claim 1, wherein the respective sets of diffractive features within the successive zones along the first dimension of the array have a different common pitch.

5. The image light guide of claim 1, wherein the diffractive features of adjacent zones along the second dimension of the array have respective linear diffractive features that abut each other forming contiguous chordal segments of a curve.

6. The image light guide of claim 1, wherein each of the image-bearing light beams includes angularly encoded information concerning a pixel within the virtual image and the multi-dimensional array of zones is configured to overlap each of the image-bearing light beams within the eyebox.

7. The image light guide of claim 6, wherein the multi-dimensional array of zones focuses each of the image-bearing light beams within the virtual image to a different focus spot, and both the stepwise variation in pitch between the successive zones along the first dimension of the array and a stepwise variation in the orientation of the diffractive features between the successive zones along the second dimension of the array are limited to avoid overlap between the different focus spots within the virtual image.

8. The image light guide of claim 7, wherein the stepwise variation in orientation between the successive zones along the second dimension of the array is no more than 0.05 degrees.

9. The image light guide of claim 1, wherein the out-coupling diffractive optic is arranged to reflect one portion and to diffract another portion of each of the image-bearing light beams through each of a plurality of encounters with each of the image-bearing light beams.

10. The image light guide of claim 9, further comprising an intermediate turning grating arranged to expand a dimension of each of the image-bearing light beams in advance of the out-coupling diffractive optic, and each of the so-expanded image-bearing light beams encounters a plurality of zones along the second dimension of the array upon each encounter of the image-bearing light beam with the out-coupling diffractive optic.

11. The image light guide of claim 1, wherein the near focus position is within two meters of the waveguide.

12. The image light guide of claim 1, wherein the waveguide is arranged to propagate the image-bearing light beams from the in-coupling diffractive optic to the out-coupling diffractive optic as a set of angularly related collimated beams and the array of zones in the out-coupling diffractive optic is arranged to convert each of the collimated beams into a diverging beam.

13. An image light guide for forming a virtual image, comprising:

a waveguide;

an in-coupling diffractive optic arranged to direct image-bearing light beams into the waveguide;

an out-coupling diffractive optic arranged to direct the image-bearing light beams from the waveguide toward an eyebox;

the out-coupling diffractive optic including a multi-dimensional array of zones each comprising a set of diffractive features;

the diffractive features within each set having a common orientation; and successive zones along a first dimension of the array having respective sets of diffractive features with different orientations that progressively vary between the successive zones in a stepwise manner, wherein the out-coupling diffractive optic is configured to form a virtual image viewable from the eyebox at a near focus distance, wherein the sets of diffractive features in the successive zones along a second dimension of the array are oriented in a same direction, and wherein the pitch of the diffractive features is constant along the first dimension of the array.

14. The image light guide of claim 13, wherein the sets of diffractive features in the successive zones along the first dimension of the array share a common shape, and the common shape is a linear or curvilinear shape.

15. The image light guide of claim 13, wherein the diffractive features along the second dimension of the array progressively vary in pitch.

16. The image light guide of claim 13, wherein the diffractive features within each set have equal pitch and successive zones along the second dimension of the array have respective sets of diffractive features with a different pitch that progressively varies between the successive zones in a stepwise manner.

17. The image light guide of claim 13, wherein the diffractive features within the successive zones along the second dimension of the array have a differing pitch.

18. The image light guide of claim 13, wherein the diffractive features of adjacent zones along the first dimension of the array have respective linear diffractive features that abut each other forming contiguous chordal segments of a curve.

19. The image light guide of claim 13, wherein each of the image-bearing light beams includes angularly encoded information concerning a pixel within the virtual image and the out-coupling diffractive optic is configured to overlap each of the image-bearing light beams within the eyebox.

20. The image light guide of claim 13, wherein the out-coupling diffractive optic focuses each of the image-bearing light beams within the virtual image to a different focus spot, and the stepwise variation in the orientation of the diffractive features between the successive zones along the first dimension of the array is limited to avoid overlap between the different focus spots within the virtual image.

21. The image light guide of claim 20, wherein the stepwise variation in orientation between the successive zones along the first dimension of the array is no more than 0.05 degrees.

22. The image light guide of claim 13, wherein the out-coupling diffractive optic is arranged to reflect one portion and to diffract another portion of each of the image-bearing light beams through each of a plurality of encounters with each of the image-bearing light beams.

23. The image light guide of claim 22, further comprising an intermediate turning grating arranged along the waveguide arranged to expand a dimension of each of the image-bearing light beams in advance of the out-coupling diffractive optic, and each of the so-expanded image-bearing light beams encounters a plurality of zones along a first of the dimensions of the array upon each encounter of the image-bearing light beam with the out-coupling diffractive optic.

24. The image light guide of claim 13, wherein the near focus position is within two meters of the waveguide.

25. The image light guide of claim 13, wherein the waveguide is arranged to propagate the image-bearing light beams from the in-coupling diffractive optic to the out-coupling diffractive optic as a set of angularly related collimated beams and the out-coupling diffractive optic is arranged to convert each of the collimated beams into a diverging beam.

26. An imaging apparatus for forming a virtual image, comprising:
- a planar waveguide having first and second plane-parallel surfaces;
- an in-coupling diffractive optic arranged to direct image-bearing light beams into the waveguide; and
- an out-coupling diffractive optic arranged to direct the image-bearing light beams from the waveguide toward an eyebox,
- the waveguide being arranged to propagate the image-bearing light beams from the in-coupling diffractive optic to the out-coupling diffractive optic as a set of angularly related collimated beams;
- the out-coupling diffractive optic having a two-dimensional array of contiguous diffractive zones,
- wherein each of the diffractive zones:
  - (i) has first and second pairs of opposite sides, and
  - (ii) has a set of diffractive features that extend between the second pair of opposite sides,
  - wherein the diffractive features in each set have a common orientation and a common pitch;
- a succession of the zones along a first dimension of the array having contiguous sides among the first pair of sides and respective sets of diffractive features that progressively vary in pitch in a stepwise manner, wherein the sets of diffractive features in the successive zones along the first dimension are oriented in a common direction;
- a succession of the zones along a second dimension of the array having contiguous sides among the second pair of sides and respective sets of diffractive features that progressively vary in orientation in a stepwise manner, wherein the pitch of the diffractive features is constant along the second dimension of the array; and
- the successions of zones along the first and second dimensions of the array arranged to convert each of the collimated beams into a diverging beam that appears to emanate from a near focus spot on an opposite side of the planar waveguide as viewed within the eyebox.

27. The imaging apparatus of claim 26, wherein the out-coupling diffractive optic focuses each of the image-bearing light beams within the virtual image to a different focus spot, and both the stepwise variation in pitch between the successive zones along the first dimension of the array and a stepwise variation in the orientation of the diffractive features between the successive zones along the second dimension of the array are limited to avoid overlap between the different focus spots within the virtual image.

28. The imaging apparatus of claim 26, wherein the out-coupling diffractive optic is arranged to reflect one portion and to diffract another portion of each of the image-bearing light beams through each of a plurality of encounters with each of the image-bearing light beams, and further comprising an intermediate turning grating for expanding one dimension of each of the image-bearing light beams in advance of the out-coupling diffractive optic, and each of the so-expanded image-bearing light beams encounters a plurality of zones along a second of the two dimensions of the array upon each encounter of the image-bearing light beam with the out-coupling diffractive optic.

29. An imaging apparatus for forming dual virtual images, comprising:
- a planar waveguide having first and second plane-parallel surfaces;
- a first in-coupling diffractive optic arranged to direct a first set of image-bearing light beams into the waveguide;
- a first out-coupling diffractive optic arranged to direct the first set of image-bearing light beams from the waveguide toward an eyebox;
- a second in-coupling diffractive optic arranged to direct a second set of image-bearing light beams into the waveguide;
- a second out-coupling diffractive optic arranged to direct the second set of image-bearing light beams from the waveguide toward the eyebox, the second out-coupling diffractive optic having an array of contiguous diffractive zones, each of the diffractive zones including a set of diffractive features having a common orientation;
- a succession of the diffractive zones along a first dimension of the array comprising respective sets of diffractive features that progressively vary in pitch in a stepwise manner;
- a succession of the diffractive zones along a second dimension of the array comprising respective sets of diffractive features having a different common orientation that progressively varies between the successive zones along the second dimension in a stepwise manner, wherein the pitch of the diffractive features is constant along the second dimension of the array;
- the first out-coupling diffractive optic arranged to form a virtual image viewable from the eyebox at a first focus distance; and
- the second out-coupling diffractive optic arranged to form a virtual image viewable from the eyebox at a second nearer focus distance.

30. The imaging apparatus of claim 29, wherein the waveguide is arranged to propagate the second set of image-bearing light beams from the second in-coupling diffractive optic to the second out-coupling diffractive optic as a set of angularly related collimated beams, and the array of contiguous diffractive zones is arranged to convert each of the collimated beams into a diverging beam.

31. The imaging apparatus of claim 29, wherein the first and second out-coupling diffractive optics are configured in a multifocal arrangement.

32. The imaging apparatus of claim 31, wherein the first and second out-coupling diffractive optics are coplanar.

33. The imaging apparatus of claim 32, wherein the first and second out-coupling diffractive optics are offset.

34. The imaging apparatus of claim 31, wherein the first and second out-coupling diffractive optics are configured in a progressive focus arrangement.

35. The imaging apparatus of claim 29, wherein the first in-coupling diffractive optic comprises an array of contiguous diffractive zones.

36. The imaging apparatus of claim 29, further comprising a projector operable to selectively direct the first set of image-bearing light beams to the first in-coupling diffractive optic and the second set of image-bearing light beams to the second in-coupling diffractive optic, wherein the second set of image-bearing light beams is different than the first set of image-bearing light beams.

* * * * *